(12) United States Patent
Chai et al.

(10) Patent No.: US 12,309,784 B2
(45) Date of Patent: May 20, 2025

(54) UPLINK TRANSMISSION TIME DOMAIN RESOURCE DETERMINING METHOD AND APPARATUS

(71) Applicant: Huawei Technologies Co., Ltd., Shenzhen (CN)

(72) Inventors: Xiaomeng Chai, Shanghai (CN); Yiqun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 435 days.

(21) Appl. No.: 17/671,247

(22) Filed: Feb. 14, 2022

(65) Prior Publication Data

US 2022/0167350 A1 May 26, 2022

Related U.S. Application Data

(63) Continuation of application No. PCT/CN2020/109578, filed on Aug. 17, 2020.

(30) Foreign Application Priority Data

Aug. 15, 2019 (CN) .......................... 201910755754.0
Apr. 7, 2020 (CN) .......................... 202010299211.5

(51) Int. Cl.
 *H04W 72/21* (2023.01)
 *H04L 27/26* (2006.01)
 (Continued)

(52) U.S. Cl.
 CPC ......... *H04W 72/21* (2023.01); *H04L 27/2607* (2013.01); *H04W 56/001* (2013.01); *H04W 72/0446* (2013.01); *H04W 72/0453* (2013.01)

(58) Field of Classification Search
 CPC ............. H04W 72/21; H04W 72/0446; H04W 72/0453; H04W 72/1268; H04W 56/001;
 (Continued)

(56) References Cited

U.S. PATENT DOCUMENTS

2019/0053211 A1* 2/2019 Ying .................... H04W 72/044
2019/0082456 A1 3/2019 Kim et al.
2021/0029743 A1* 1/2021 Lei ....................... H04B 1/7143

FOREIGN PATENT DOCUMENTS

CN 109863817 A 6/2019

OTHER PUBLICATIONS

"Discussion on Channel Structure for 2-step RACH," [online] 3GPP TSG RAN WG1 Meeting #97, Reno, USA, R1-1906717, Total 11 pages, 3rd Generation Partnership Project, Valbonne, France (May 13-17, 2019).

(Continued)

*Primary Examiner* — Ricardo H Castaneyra
(74) *Attorney, Agent, or Firm* — Leydig, Voit & Mayer, Ltd.

(57) ABSTRACT

An uplink transmission time domain resource determining method includes: receiving first information sent by a network device, where the first information is used to configure a time domain resource of a physical uplink shared channel PUSCH occasion, and the first information includes guard period configuration information and time domain resource configuration information of the PUSCH occasion; and determining time domain resources of a plurality of first PUSCH occasions based on the first information, where all time domain symbols of each first PUSCH occasion are in a same slot, and a time domain interval between at least two adjacent first PUSCH occasions in the plurality of first PUSCH occasions is greater than or equal to a guard period configured based on the guard period configuration information.

19 Claims, 11 Drawing Sheets

(51) Int. Cl.
*H04W 56/00* (2009.01)
*H04W 72/0446* (2023.01)
*H04W 72/0453* (2023.01)

(58) Field of Classification Search
CPC ............. H04L 27/2607; H04L 27/2605; H04L 5/0044; H04L 5/0053; H04L 5/0062
USPC ........................................................ 370/329
See application file for complete search history.

(56) References Cited

OTHER PUBLICATIONS

"Discussion on Channel Structure for Two-Step RACH," [online] 3GPP TSG RAN WG1 #97, Reno, USA, R1-1906192, Total 7 pages, 3rd Generation Partnership Project, Valbonne, France (May 13-17, 2019).

"Discussion on channel structure for 2-step RACH," 3GPP TSG RAN WG1 #97, Reno, USA, R1-1906779, pp. 1-9, 3rd Generation Partnership Project, Valbonne, France (May 13-17, 2019).

"3rd Generation Partnership Project; Technical Specification Group Radio Access Network; NR; Physical channels and modulation (Release 15)," 3GPP TS 38.211 V15.6.0, pp. 1-97, 3rd Generation Partnership Project, Valbonne, France (Jun. 2019).

"Channel structure for 2-step RACH," 3GPP TSG RAN WG1 #96bis, Xi'an, China, R1-1904280, pp. 1-11, 3rd Generation Partnership Project, Valbonne, France (Apr. 8-12, 2019).

"3rd Generation Partnership Project; Technical Specification Group Radio Access Network; NR; Physical layer procedures for control (Release 15)," 3GPP TS 38.213 V15.6.0, pp. 1-107, 3rd Generation Partnership Project, Valbonne, France (Jun. 2019).

"3rd Generation Partnership Project; Technical Specification Group Radio Access Network; NR; Physical layer procedures for data (Release 15)," 3GPP TS 38.214 V15.6.0, pp. 1-105, 3rd Generation Partnership Project, Valbonne, France (Jun. 2019).

"3rd Generation Partnership Project; Technical Specification Group Radio Access Network; NR; Radio Resource Control (RRC) protocol specification (Release 15)," 3GPP TS 38.331 V15.6.0, pp. 1-519, 3rd Generation Partnership Project, Valbonne, France (Jun. 2016).

"Summary of 7.2.1.1 Channel Structure for Two-step RACH," 3GPP TSG RAN WG1 #97, Reno, USA, R1-1907673, Total 62 pages, 3rd Generation Partnership Project, Valbonne, France (May 13-17, 2019).

Sony, "Considerations on Channel Structure for Two-Step RACH," 3GPP TSG RAN WG1 Meeting #97, Reno, USA, R1-1906848, total 4 pages, 3rd Generation Partnership Project, Valbonne, France (May 13-17, 2019).

Nokia, Nokia Shanghai Bell, "On 2-step RACH Channel Structure," 3GPP TSG RAN WG1 #97, Reno, USA, R1-1906746, total 16 pages, 3rd Generation Partnership Project, Valbonne, France (May 13-17, 2019).

* cited by examiner

| Symbol | Slot n | | | | | | | | | | | | | | Slot n+1 | | | | | | | | | | | | | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| | PO #0 | | | | | PO #1 | | | | | PO #2 | | | | PO #3 | | | | | | | | | | | | | |

FIG. 8A

| Symbol | Slot n | | | | | | | | | | | | | | Slot n+1 | | | | | | | | | | | | | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| | PO #0 | | | | | PO #1 | | | | | PO #2 | | | | PO #3 | | | | | | | | | | | | | |

FIG. 8B

| Symbol | Slot n | | | | | | | | | | | | | | Slot n+1 | | | | | | | | | | | | | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| | PO #0 | | | | PO #1 | | | | | PO #2 | | | | | PO #3 | | | | | | | | | | | | | |

FIG. 9A

| Symbol | Slot n | | | | | | | | | | | | | | Slot n+1 | | | | | | | | | | | | | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| | PO #0 | | | | PO #1 | | | | | PO #2 | | | | | PO #3 | | | | | | | | | | | | | |

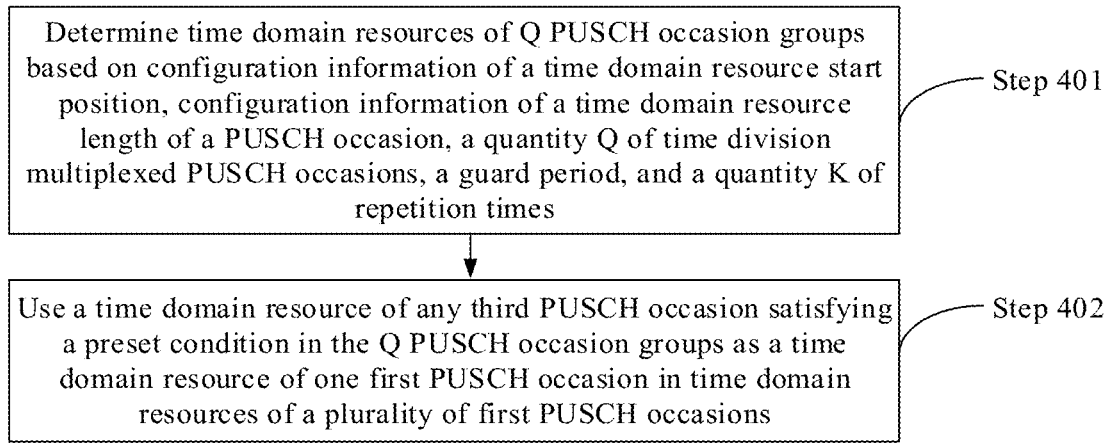

Step 401: Determine time domain resources of Q PUSCH occasion groups based on configuration information of a time domain resource start position, configuration information of a time domain resource length of a PUSCH occasion, a quantity Q of time division multiplexed PUSCH occasions, a guard period, and a quantity K of repetition times Step 402: Use a time domain resource of any third PUSCH occasion satisfying a preset condition in the Q PUSCH occasion groups as a time domain resource of one first PUSCH occasion in time domain resources of a plurality of first PUSCH occasions

| Symbol | Slot n | | | | | | | | | | | | | | Slot n+1 | | | | | | | | | | | | | |
|--|--|--|--|--|--|--|--|--|--|--|--|--|--|--|--|--|--|--|--|--|--|--|--|--|--|--|--|--|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| | PO #0 | | | | | | PO #1 | | | | | | | | PO #2 | | | | | | PO #3 | | | | | | | |
FIG. 16
| Symbol | Slot n | | | | | | | | | | | | | | Slot n+1 | | | | | | | | | | | | | |
|--|--|--|--|--|--|--|--|--|--|--|--|--|--|--|--|--|--|--|--|--|--|--|--|--|--|--|--|--|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| | PO #0 | | | | | | PO #1 | | | | PO #2 | | | | PO #0 | | | | | | PO #1 | | | | PO #2 | | | |
FIG. 17
| Slot n | Slot n+1 | Slot n+2 | Slot n+3 | Slot n+4 | Slot n+5 |
|--|--|--|--|--|--|
| PO #0 | PO #1 | | | PO #2 | |
FIG. 18
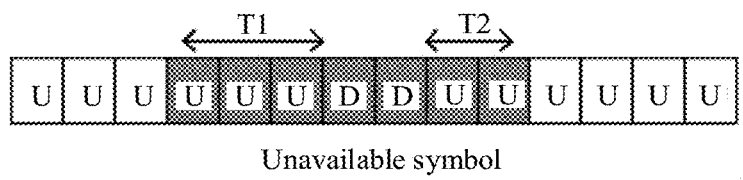
Unavailable symbol
FIG. 19A
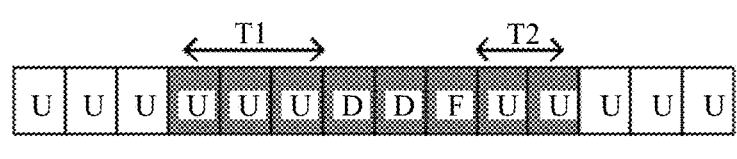
Unavailable symbol
FIG. 19B

UPLINK TRANSMISSION TIME DOMAIN RESOURCE DETERMINING METHOD AND APPARATUS

CROSS-REFERENCE TO RELATED APPLICATIONS

This application is a continuation of International Application No. PCT/CN2020/109578, filed on Aug. 17, 2020, which claims priority to Chinese Patent Application No. 201910755754.0, filed on Aug. 15, 2019, and Chinese Patent Application No. 202010299211.5, filed on Apr. 7, 2020. All of the aforementioned patent applications are hereby incorporated by reference in their entireties.

TECHNICAL FIELD

This application relates to communications technologies, and in particular, to an uplink transmission time-frequency resource determining method and an apparatus.

BACKGROUND

In wireless communications systems such as long term evolution (LTE), 5th generation (5G), and new radio (NR), user equipment (UE) needs to enter a radio resource control (RRC) connected state from an RRC idle state or inactive state through random access, to establish various bearers with a base station and obtain transmission resources and parameter configurations, so as to communicate with the base station.

Random access may be classified into contention-based random access and contention-free random access. The contention-based random access is usually completed by using a four-step random access process. The four-step random access process cannot satisfy a data transmission requirement in a low-latency and high-reliability scenario in a 5G system.

SUMMARY

This application provides an uplink transmission time-frequency resource determining method and an apparatus, to avoid interference between adjacent physical uplink shared channel (PUSCH) occasions that is caused due to asynchronization between a terminal device and a network device, and satisfy a data transmission requirement in a low-latency and high-reliability scenario in a 5G system.

According to a first aspect, this application provides an uplink transmission time domain resource determining method. The method may include: receiving first information sent by a network device, where the first information is used to configure a time domain resource of a physical uplink shared channel (PUSCH) occasion, and the first information includes guard period configuration information and time domain resource configuration information of the PUSCH occasion; and determining time domain resources of a plurality of first PUSCH occasions based on the first information, where all time domain symbols of each first PUSCH occasion are in a same slot, and a time domain interval between at least two adjacent first PUSCH occasions in the plurality of first PUSCH occasions is greater than or equal to a guard period configured based on the guard period configuration information.

In this implementation, the time domain resources of the plurality of first PUSCH occasions are determined based on the first information. All time domain symbols of each first PUSCH occasion are in a same slot, and the time domain interval between the at least two adjacent first PUSCH occasions in the plurality of first PUSCH occasions is greater than or equal to the guard period configured based on the guard period configuration information. This can prevent a first PUSCH occasion from being cross-slot. In addition, a terminal device does not send uplink data in a guard period between at least two adjacent first PUSCH occasions. This can avoid interference between adjacent first PUSCH occasions that is caused due to asynchronization between the terminal device and the network device, so as to satisfy a data transmission requirement in a low-latency and high-reliability scenario in a 5G system.

In a possible design, a time domain resource length of each of the plurality of first PUSCH occasions is greater than or equal to a first time domain length threshold.

In this implementation, a time domain resource of each first PUSCH occasion determined based on the first information is greater than or equal to the first time domain length threshold. This can avoid a problem that coverage and decoding performance are reduced because a time domain resource of a first PUSCH occasion used for uplink data transmission is excessively small.

In a possible design, a time domain interval between any two adjacent first PUSCH occasions in the plurality of first PUSCH occasions and a former PUSCH occasion in the any two adjacent first PUSCH occasions are in a same slot.

In a possible design, a time domain interval between two adjacent first PUSCH occasions in the plurality of first PUSCH occasions and a latter PUSCH occasion in the two adjacent first PUSCH occasions are in a same slot.

In a possible design, the time domain resource configuration information may include configuration information of a time domain resource start position, configuration information of a time domain resource length of the PUSCH occasion, and a quantity Q of time division multiplexed PUSCH occasions.

In a possible design, the determining time domain resources of a plurality of first PUSCH occasions based on the first information may include: determining time domain resources of Q second PUSCH occasions based on the configuration information of the time domain resource start position, the configuration information of the time domain resource length of the PUSCH occasion, the quantity Q of time division multiplexed PUSCH occasions, and the guard period, where a quantity of time domain symbols separating time domain resources of any two adjacent second PUSCH occasions in the Q second PUSCH occasions is equal to the guard period. A time domain resource of any second PUSCH occasion satisfying a preset condition in the time domain resources of the Q second PUSCH occasions is a time domain resource of one first PUSCH occasion in the time domain resources of the plurality of first PUSCH occasions, where the preset condition includes: all time domain symbols of the second PUSCH occasion are in a same slot; or all time domain symbols of the second PUSCH occasion and a guard period after the second PUSCH occasion are in a same slot.

In a possible design, the determining time domain resources of a plurality of first PUSCH occasions based on the first information may include: for a second PUSCH occasion that does not satisfy the preset condition in the Q second PUSCH occasions, if a first part of time domain symbols and a second part of time domain symbols that are of the second PUSCH occasion are respectively in two adjacent slots, and a quantity of the first part of time domain symbols of the second PUSCH occasion is greater than or equal to a sum of the first time domain length threshold and the guard period, determining that first N time domain symbols in the first part of time domain symbols of the second PUSCH occasion are a time domain resource of one of the plurality of first PUSCH occasions, where the first part of time domain symbols of the second PUSCH occasion is in a former slot in the two adjacent slots, the second part of time domain symbols of the second PUSCH occasion is in a latter slot in the two adjacent slots, and N is a difference between the quantity of the first part of time domain symbols of the second PUSCH occasion and the guard period; and/or if a quantity of the second part of time domain symbols of the second PUSCH occasion is greater than or equal to the first time domain length threshold, determining that the second part of time domain symbols of the second PUSCH occasion is a time domain resource of one of the plurality of first PUSCH occasions.

In a possible design, the time domain resource configuration information further includes a quantity of repetition times; and the determining time domain resources of a plurality of first PUSCH occasions based on the first information may include: determining time domain resources of Q PUSCH occasion groups based on the configuration information of the time domain resource start position, the configuration information of the time domain resource length of the PUSCH occasion, the quantity Q of time division multiplexed PUSCH occasions, the guard period, and the quantity K of repetition times, where each PUSCH occasion group includes K consecutive third PUSCH occasions in time domain, and an interval between time domain resources of two adjacent PUSCH occasion groups is greater than or equal to the guard period; and using a time domain resource of any third PUSCH occasion satisfying a preset condition in the Q PUSCH occasion groups as a time domain resource of one of the plurality of first PUSCH occasions, where the preset condition includes: all time domain symbols of the third PUSCH occasion are in a same slot.

In a possible design, the determining time domain resources of a plurality of first PUSCH occasions based on the first information may include: for a third PUSCH occasion that does not satisfy the preset condition in the Q PUSCH occasion groups, if a first part of time domain symbols and a second part of time domain symbols of the third PUSCH occasion are respectively in two adjacent slots, and a quantity of the first part of time domain symbols of the third PUSCH occasion is greater than the first time domain length threshold, determining that the first part of time domain symbols of the third PUSCH occasion is a time domain resource of one of the plurality of first PUSCH occasions, where the first part of time domain symbols of the third PUSCH occasion is in a former slot in the two adjacent slots, and the second part of time domain symbols of the third PUSCH occasion is in a latter slot in the two adjacent slots.

In a possible design, the determining time domain resources of a plurality of first PUSCH occasions based on the first information may include: if a quantity of the second part of time domain symbols of the third PUSCH occasion is greater than or equal to the first time domain length threshold, determining that the second part of time domain symbols of the third PUSCH occasion is a time domain resource of one of the plurality of first PUSCH occasions.

In a possible design, the determining time domain resources of a plurality of first PUSCH occasions based on the first information may include: for a third PUSCH occasion that does not satisfy the preset condition in the Q PUSCH occasion groups, if a first part of time domain symbols and a second part of time domain symbols that are of the third PUSCH occasion are respectively in two adjacent slots, the third PUSCH occasion is the last third PUSCH occasion in a PUSCH occasion group in which the third PUSCH occasion is located, and a quantity of the first part of time domain symbols of the third PUSCH occasion is greater than or equal to the sum of the first time domain length threshold and the guard period, determining that first M time domain symbols in the first part of time domain symbols of the third PUSCH occasion are a time domain resource of one of the plurality of first PUSCH occasions, where the first part of time domain symbols of the third PUSCH occasion is in a former slot in the two adjacent slots, the second part of time domain symbols of the third PUSCH occasion is in a latter slot in the two adjacent slots, and M is a difference between the quantity of the first part of time domain symbols of the third PUSCH occasion and the guard period.

In a possible design, the time domain resource configuration information may include configuration information of a time domain resource start position, configuration information of a time domain resource length of the PUSCH occasion, and a quantity P of slots for configuring PUSCH occasions.

In a possible design, the determining time domain resources of a plurality of first PUSCH occasions based on the first information may include: determining time domain resources of first PUSCH occasions in each of P consecutive slots based on the configuration information of the time domain resource start position, the configuration information of the time domain resource length of the PUSCH occasion, and the guard period, where a quantity of time domain resources of first PUSCH occasions in each of the P consecutive slots is 1.

In a possible design, the determining time domain resources of a plurality of first PUSCH occasions based on the first information may include: determining time domain resources of first PUSCH occasions in each of P consecutive slots based on the configuration information of the time domain resource start position, the configuration information of the time domain resource length of the PUSCH occasion, and the guard period, where a quantity of time domain resources of first PUSCH occasions in each of the P consecutive slots is $$\left\lceil \frac{N_{symb}^{slot} - S}{L + N_{GP}} \right\rceil,$$

$N_{symb}^{slot}$ is a quantity of symbols in each slot, L is the time domain length configured based on the configuration information of the time domain resource length of the PUSCH occasion, $N_{GP}$ is a length of the guard period configured based on the guard period configuration information, S is a start symbol configured based on the configuration information of the time domain resource start position, and $\lfloor \ \rfloor$ is a floor operator.

In a possible design, the determining time domain resources of a plurality of first PUSCH occasions based on the first information may include: determining time domain resources of fourth PUSCH occasions in each of P consecutive slots based on the configuration information of the time domain resource start position, the configuration information of the time domain resource length of the PUSCH occasion, and the guard period; and using a time domain resource of any fourth PUSCH occasion satisfying a preset condition in each slot as a time domain resource of one of the plurality of first PUSCH occasions, where the preset condition includes that a quantity of all time domain symbols of the fourth PUSCH occasion is greater than or equal to the first time domain length threshold, a quantity of time domain resources of fourth PUSCH occasions in each of the P consecutive slots is $$\left\lceil \frac{N_{symb}^{slot} - S}{L + N_{GP}} \right\rceil,$$

$N_{symb}^{slot}$ is a quantity of symbols in each slot, L is the time domain length configured based on the configuration information of the time domain resource length of the PUSCH occasion, $N_{GP}$ is a length of the guard period configured based on the guard period configuration information, S is a start symbol configured based on the configuration information of the time domain resource start position, and ⌈ ⌉ is a ceiling operator.

In a possible design, a quantity of time domain symbols separating time domain resources of any two adjacent fourth PUSCH occasions in each slot is equal to the guard period.

In a possible design, the time domain resource configuration information may further include a quantity of time division multiplexed PUSCH occasions in each slot.

In a possible design, if the time domain resources of the plurality of first PUSCH occasions include an unavailable time domain symbol, a time domain resource of a first PUSCH occasion that includes the unavailable time domain symbol is a time domain resource of an invalid first PUSCH occasion.

In a possible design, if Z consecutive available time domain symbols exist in the first PUSCH occasion that includes the unavailable time domain symbol, the Z consecutive available time domain symbols are determined as a time domain resource of a valid first PUSCH occasion, where Z is greater than or equal to the first time domain length threshold; or first Z-$N_{GP}$ consecutive available time domain symbols in the Z consecutive available time domain symbols are determined as a time domain resource of a valid first PUSCH occasion, where Z-$N_{GP}$ is greater than or equal to the first time domain length threshold, and $N_{GP}$ is a length of the guard period configured based on the guard period configuration information.

According to a second aspect, an embodiment of this application provides an uplink transmission time domain resource determining method. The method may include: sending first information to a terminal device, where the first information is used to configure a time domain resource of a physical uplink shared channel PUSCH occasion, and the first information includes guard period configuration information and time domain resource configuration information of the PUSCH occasion; and determining time domain resources of a plurality of first PUSCH occasions based on the first information, where all time domain symbols of each first PUSCH occasion are in a same slot, and a time domain interval between at least two adjacent first PUSCH occasions in the plurality of first PUSCH occasions is greater than or equal to a guard period configured based on the guard period configuration information.

In a possible design, a time domain resource length of each of the plurality of first PUSCH occasions is greater than or equal to a first time domain length threshold.

In a possible design, a time domain interval between any two adjacent first PUSCH occasions in the plurality of first PUSCH occasions and a former PUSCH occasion in the any two adjacent first PUSCH occasions are in a same slot.

In a possible design, a time domain interval between two adjacent first PUSCH occasions in the plurality of first PUSCH occasions and a latter PUSCH occasion in the two adjacent first PUSCH occasions are in a same slot.

In a possible design, the time domain resource configuration information includes configuration information of a time domain resource start position, configuration information of a time domain resource length of the PUSCH occasion, and a quantity Q of time division multiplexed PUSCH occasions.

In a possible design, the time domain resource configuration information includes configuration information of a time domain resource start position, configuration information of a time domain resource length of the PUSCH occasion, and a quantity P of slots for configuring PUSCH occasions.

In a possible design, the time domain resource configuration information further includes a quantity of time division multiplexed PUSCH occasions in each slot.

According to a third aspect, an embodiment of this application provides a communications apparatus. The apparatus may be a terminal device, or may be a chip in the terminal device. The apparatus has a function of implementing the terminal device in the foregoing embodiments. The function may be implemented by hardware, or may be implemented by hardware executing corresponding software. The hardware or software includes one or more units corresponding to the foregoing function.

In a possible design, when the apparatus is a terminal device, the apparatus may include a processing module and a transceiver module. The processing module may be, for example, a processor, the transceiver module may be, for example, a transceiver, and the transceiver may include a radio frequency circuit and a baseband circuit.

Optionally, the apparatus may further include a storage unit, and the storage unit may be, for example, a memory. When the apparatus includes the storage unit, the storage unit is configured to store a computer executable instruction. The processing module is connected to the storage unit, and the processing module executes the computer executable instruction stored in the storage unit, so that the terminal device performs the uplink transmission time domain resource determining method according to any one of the possible designs of the first aspect.

In another possible design, when the apparatus is a chip in the terminal device, the chip includes a processing module and a transceiver module. The processing module may be, for example, a processor, and the transceiver module may be, for example, an input/output interface, a pin, or a circuit on the chip. Optionally, the apparatus may further include a storage unit. The processing module may execute a computer executable instruction stored in the storage unit, so that the terminal device performs the uplink transmission time domain resource determining method according to any one of the possible designs of the first aspect.

Optionally, the storage unit is a storage unit in the chip, such as a register or a cache. Alternatively, the storage unit may be a storage unit that is outside the chip and that is in the terminal device, such as a read-only memory (ROM) or another type of static storage device that can store static information and instructions, or a random access memory (RAM).

The processor mentioned in any one of the foregoing designs may be a general-purpose central processing unit (CPU), a microprocessor, an application-specific integrated circuit (ASIC), or one or more integrated circuits configured to control program execution of the uplink transmission time domain resource determining method in the foregoing aspects.

According to a fourth aspect, this application provides a communications apparatus. The apparatus may be a network device, or may be a chip in the network device. The apparatus has a function of implementing the embodiments related to the network device in the foregoing aspects. The function may be implemented by hardware, or may be implemented by hardware executing corresponding software. The hardware or software includes one or more units corresponding to the foregoing function.

In a possible design, when the apparatus is a network device, the apparatus may include a processing module and a transceiver module. The processing module may be, for example, a processor. The transceiver module may be, for example, a transceiver. The transceiver includes a radio frequency circuit. Optionally, the apparatus further includes a storage unit. The storage unit may be, for example, a memory. When the apparatus includes the storage unit, the storage unit is configured to store a computer executable instruction. The processing module is connected to the storage unit, and the processing module executes the computer executable instruction stored in the storage unit, so that the apparatus performs the uplink transmission time domain resource determining method according to the second aspect.

In another possible design, when the apparatus is a chip in the network device, the chip includes a processing module and a transceiver module. The processing module may be, for example, a processor, and the transceiver module may be, for example, an input/output interface, a pin, or a circuit on the chip. The processing module may execute a computer executable instruction stored in a storage unit, so that the chip in the network device performs the uplink transmission time domain resource determining method according to the foregoing aspects. Optionally, the storage unit is a storage unit in the chip, for example, a register or a cache, or the storage unit may be a storage unit in the network device but outside the chip, for example, a ROM or another type of static storage device capable of storing static information and instructions, or a RAM.

The processor mentioned in any one of the foregoing designs may be a CPU, a microprocessor, an ASIC, or one or more integrated circuits configured to control program execution of the uplink transmission time domain resource determining method.

According to a fifth aspect, a computer storage medium is provided. The computer storage medium stores program code, and the program code is used to indicate instructions of performing the method according to any one of the first aspect and the second aspect or the possible implementations thereof. According to a sixth aspect, a processor is provided. The processor is coupled to a memory, and is configured to perform the method according to any one of the first aspect and the second aspect or the possible implementations thereof.

According to a seventh aspect, a computer program product including instructions is provided. When the computer program product is run on a computer, the computer is enabled to perform the method according to any one of the first aspect and the second aspect or the possible implementations thereof.

According to an eighth aspect, a communications system is provided. The system includes the terminal device in any possible implementation of the third aspect and the network device in any possible implementation of the fourth aspect.

According to the uplink transmission time-frequency resource determining method and the apparatus in this application, the network device sends the first information to the terminal device, and the terminal device determines the time domain resources of the plurality of first PUSCH occasions based on the first information. All time domain symbols of each first PUSCH occasion are in a same slot, and the time domain interval between the at least two adjacent first PUSCH occasions in the plurality of first PUSCH occasions is greater than or equal to the guard period configured based on the guard period configuration information. The terminal device sends the first message to the network device. The first message includes the random access preamble and the uplink data. The random access preamble is sent on the physical random access channel (PRACH), and the uplink data is sent on the one or more of the plurality of first PUSCH occasions. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device, and satisfy a data transmission requirement in a low-latency and high-reliability scenario in a 5G system.

BRIEF DESCRIPTION OF DRAWINGS

FIG. 8A is a schematic diagram of a time domain resource of another PUSCH occasion according to an embodiment of this application;

FIG. 8B is a schematic diagram of a time domain resource of another PUSCH occasion according to an embodiment of this application;

FIG. 9A is a schematic diagram of a time domain resource of another PUSCH occasion according to an embodiment of this application;

FIG. 9B is a schematic diagram of a time domain resource of another PUSCH occasion according to an embodiment of this application;

FIG. 10A is a schematic diagram of a time domain resource of another PUSCH occasion according to an embodiment of this application;

FIG. 10B is a schematic diagram of a time domain resource of another PUSCH occasion according to an embodiment of this application;

FIG. 11 is a flowchart of another uplink transmission time domain resource determining method according to an embodiment of this application;

FIG. 12A is a schematic diagram of a time domain resource of another PUSCH occasion according to an embodiment of this application;

FIG. 12B is a schematic diagram of a time domain resource of another PUSCH occasion according to an embodiment of this application;

FIG. 13A is a schematic diagram of a time domain resource of another PUSCH occasion according to an embodiment of this application;

FIG. 16 is a schematic diagram of a time domain resource of another PUSCH occasion according to an embodiment of this application;

FIG. 17 is a schematic diagram of a time domain resource of another PUSCH occasion according to an embodiment of this application;

FIG. 18 is a schematic diagram of a time domain resource of another PUSCH occasion according to an embodiment of this application;

FIG. 19A is a schematic diagram of unavailable symbols according to an embodiment of this application;

FIG. 19B is a schematic diagram of unavailable symbols according to an embodiment of this application;

DESCRIPTION OF EMBODIMENTS

Figure 1:
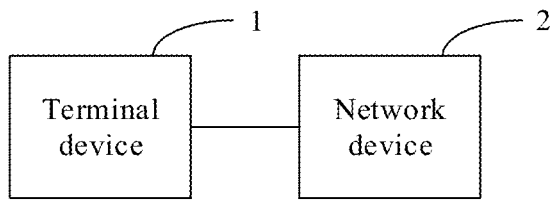
FIG. 1 is a schematic diagram of an application scenario according to an embodiment of this application.

In embodiments, claims, and the accompanying drawings of this specification in this application, the terms "first", "second" and the like are only used for distinction and description, and should not be understood as indicating or implying relative importance or a sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

A network device in this application is a device that can communicate with a terminal device. The network device may be an access network device, a relay node, or an access point. For example, the network device may be an evolved NodeB (Evolutional NodeB, eNB or eNodeB) in long term evolution (LTE). The network device may alternatively be a radio controller in a cloud radio access network (CRAN) scenario. The network device may alternatively be a network device in a 5G network or a network device in a future evolved public land mobile network (PLMN). The network device may alternatively be a wearable device, a vehicle-mounted device, or the like.

A terminal device in this application is a communications apparatus that has a communication function. For example, the terminal device may be a wireless communications device, an Internet of things (IoT) device, a wearable device or a vehicle-mounted device, a mobile terminal, or customer premises equipment (CPE). The mobile terminal may also be referred to as user equipment (UE), an access terminal, a subscriber unit, a subscriber station, a mobile station, a mobile console, a user terminal, a terminal, a wireless communications device, a user agent, or a user apparatus. The mobile terminal may be a smartphone, a cellular phone, a cordless phone, a tablet computer, a personal digital assistant (PDA) device, an IoT device with a wireless communication function, a computing device or another processing device connected to a wireless modem, a vehicle-mounted device, a wearable device, a terminal device in a 5G network, a terminal device in a further evolved PLMN network, or the like.

For example, FIG. 1 is a schematic diagram of an application scenario according to an embodiment of this application. As shown in FIG. 1, the application scenario may include a terminal device 1 and a network device 2. The terminal device 1 may be a terminal device in any one of the foregoing forms. Correspondingly, the network device 2 may be a network device in any one of the foregoing forms. The terminal device may determine an available uplink transmission time domain resource according to an uplink transmission time domain resource determining method in this application. The method includes: receiving first information sent by a network device, where the first information is used to configure a physical uplink shared channel (PUSCH) occasion, and the first information may include guard period configuration information and time domain resource configuration information of the PUSCH occasion; and determining time domain resources of a plurality of first PUSCH occasions based on the first information, where all time domain symbols of each first PUSCH occasion are in a same slot, and a time domain interval between at least two adjacent first PUSCH occasions in the plurality of first PUSCH occasions is greater than or equal to a guard period configured based on the guard period configuration information. The terminal device does not send uplink data in the guard period, to avoid interference between adjacent first PUSCH occasions that is caused due to asynchronization between the terminal device and the network device. For a specific description thereof, refer to descriptions in the following embodiments.

A PUSCH occasion (PO) in this application refers to a time-frequency resource that can be used by a terminal device to send uplink data. The terminal device may send uplink data by using one or more PUSCH occasions, and the one or more PUSCH occasions are a PUSCH.

Figure 2:
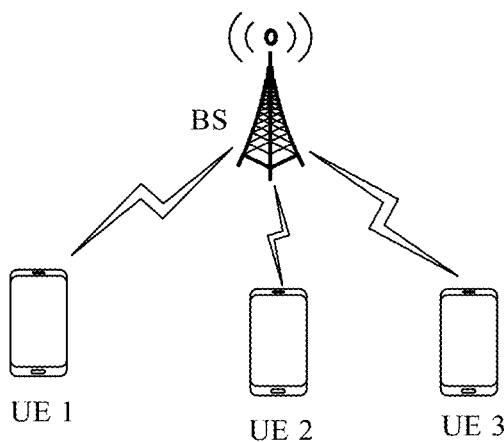
FIG. 2 is another schematic diagram of an application scenario according to an embodiment of this application.

For example, FIG. 2 is a schematic diagram of another application scenario according to an embodiment of this application. As shown in FIG. 2, in this application scenario, one base station (BS) and three UEs are used as an example for description. The three UEs are UE 1, UE 2, and UE 3. For example, the BS, the UE 1, the UE 2, and the UE 3 form a single-cell communications system, and the UE 1, the UE 2, and the UE 3 may separately or simultaneously send uplink data to the BS. In a process of sending uplink data to the BS by any one or more of the UE 1, the UE 2, and the UE 3, time domain resources of a plurality of first PUSCH occasions may be determined according to the uplink transmission time domain resource determining method in this application, to send the uplink data on one or more time domain resources in the plurality of first PUSCH occasions. It should be noted that, one BS and a single cell are used as an example for description in this embodiment, but this embodiment of this application is not limited thereto.

Figure 3:
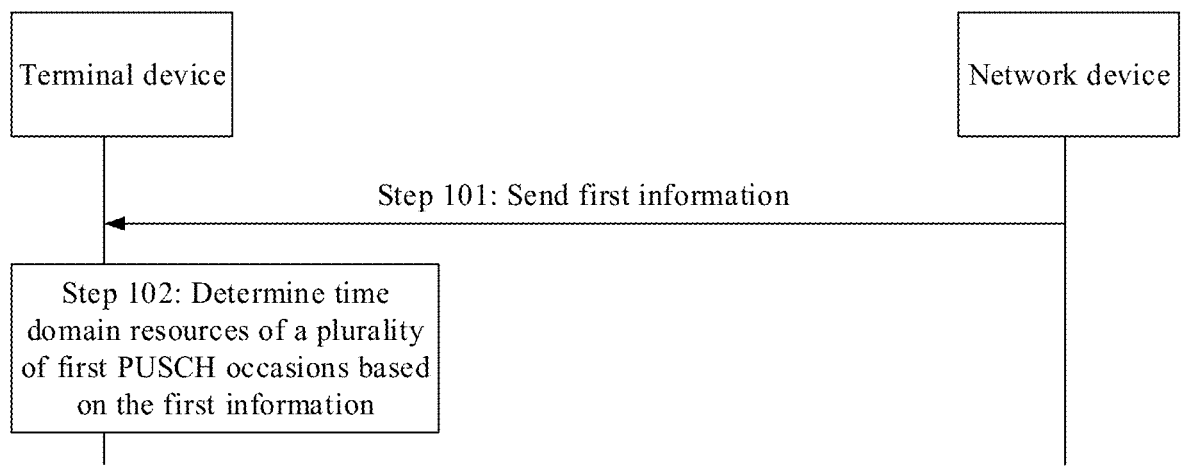
FIG. 3 is a flowchart of an uplink transmission time domain resource determining method according to an embodiment of this application.

FIG. 3 is a flowchart of an uplink transmission time domain resource determining method according to an embodiment of this application. The method in this embodiment relates to a terminal device and a network device. As shown in FIG. 3, the method in this embodiment may include the following steps.

Step 101: The network device sends first information to the terminal device.

The terminal device receives the first information sent by the network device. The first information is used to configure a time domain resource of a PUSCH occasion, and the first information may include guard period configuration information and time domain resource configuration information of the PUSCH occasion. The guard period configuration information is used to configure a guard period, and the terminal device does not send uplink data in the guard period. The time domain resource configuration information of the PUSCH occasion is used to configure time domain resources of a plurality of first PUSCH occasions in the following step. If the network device does not configure the guard period configuration information, it is considered by default that a length of the guard period is 0.

For example, the first information may be sent through a broadcast message. The foregoing application scenario shown in FIG. 2 is used as an example for description. The BS may send a broadcast message. The UE 1, the UE 2, and the UE 3 separately receive the broadcast message sent by the BS, and the broadcast message carries the first information. Certainly, it may be understood that the first information may alternatively be sent through another signaling message. This embodiment of this application is not limited to this example.

Step 102: The terminal device determines time domain resources of a plurality of first PUSCH occasions based on the first information.

All time domain symbols of each first PUSCH occasion are in a same slot (slot), and a time domain interval between at least two adjacent first PUSCH occasions in the plurality of first PUSCH occasions is greater than or equal to the guard period configured based on the guard period configuration information. The terminal device does not send uplink data in a guard period between at least two adjacent first PUSCH occasions in the plurality of first PUSCH occasions, and a time domain interval between the at least two first PUSCH occasions is greater than or equal to the guard period configured in step 101. The plurality of first PUSCH occasions may be in a plurality of consecutive slots.

The terminal device may send uplink data to the network device on one or more of the plurality of first PUSCH occasions. Correspondingly, the network device may receive, on the one or more of the plurality of first PUSCH occasions, the uplink data sent by the terminal device. Each first PUSCH occasion may be used to transmit an independent transport block (TB).

Figure 4A:
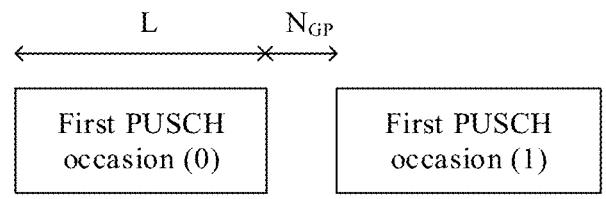
FIG. 4A is a schematic diagram of a time interval between two adjacent first PUSCH occasions according to an embodiment of this application.

Two adjacent first PUSCH occasions are used as an example for description. FIG. 4A is a schematic diagram of a time interval between two adjacent first PUSCH occasions according to an embodiment of this application. The terminal device may determine, by using the foregoing step 102, the two adjacent first PUSCH occasions shown in FIG. 4A: a first PUSCH occasion (0) and a first PUSCH occasion (1). There are a specific quantity of time domain symbols between the first PUSCH occasion (0) and the first PUSCH occasion (1). The specific quantity of time domain symbols form a time domain interval. A length of the time domain interval is greater than or equal to the guard period configured based on the guard period configuration information. When the length of the time domain interval is greater than the guard period configured based on the guard period configuration information, a previous part of the time domain interval is a guard period of a previous first PUSCH occasion, and a length of the previous part is equal to the guard period configured based on the guard period configuration information. When the length of the time domain interval is equal to the guard period configured based on the guard period configuration information, the time interval is a guard period of a previous first PUSCH occasion. The terminal device does not send uplink data in the guard period. In FIG. 4A, that the time domain interval is equal to the guard period $N_{GP}$ configured based on the guard period configuration information is used as an example. The terminal device may send uplink data in the first PUSCH occasion (0), does not send uplink data in the guard period whose length is equal to $N_{GP}$, and may further send uplink data in the first PUSCH occasion (1). A length of a time domain resource of the first PUSCH occasion (0) is equal to a length L configured based on time domain resource length configuration information of the PUSCH occasion.

Figure 4B:
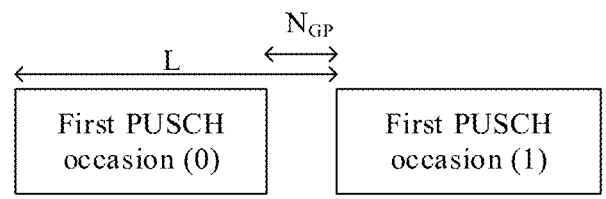
FIG. 4B is a schematic diagram of a time interval between two adjacent first PUSCH occasions according to an embodiment of this application.

It should be noted that the length L configured based on the time domain resource length configuration information of the PUSCH occasion may also be understood as a length shown in FIG. 4B. To be specific, the length L configured based on the time domain resource length configuration information of the PUSCH occasion is a time domain interval between start positions of two adjacent first PUSCH occasions. A relationship between the length L configured based on the time domain resource length configuration information of the PUSCH occasion and the guard period configured based on the guard period configuration information in this application is described by using the embodiment shown in FIG. 4A as an example, and a protection scope of this application is not limited thereto.

In this embodiment, the network device sends the first information to the terminal device, and the terminal device may determine the time domain resources of the plurality of first PUSCH occasions based on the first information. All time domain symbols of each first PUSCH occasion are in a same slot, and a time domain interval between at least two adjacent first PUSCH occasions in the plurality of first PUSCH occasions is greater than or equal to the guard period configured based on the guard period configuration information. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

The following uses several specific embodiments to describe in detail the technical solution of the method embodiment shown in FIG. 3.

Figure 5:
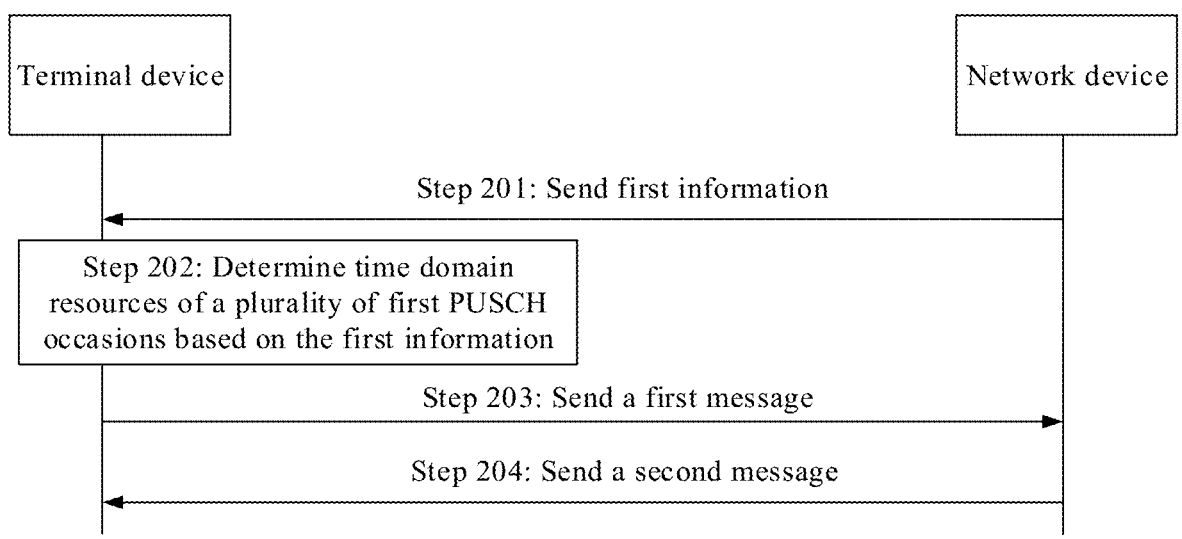
FIG. 5 is a flowchart of another uplink transmission time domain resource determining method according to an embodiment of this application.

FIG. 5 is a flowchart of another uplink transmission time domain resource determining method according to an embodiment of this application. First information in this embodiment is used to configure a PUSCH occasion in a random access process. As shown in FIG. 5, the method in this embodiment may include the following steps.

Step 201: A network device sends first information to a terminal device.

Step 202: The terminal device determines time domain resources of a plurality of first PUSCH occasions based on the first information.

For specific descriptions of step 201 and step 202, refer to step 101 and step 102 in the embodiment shown in FIG. 3. Details are not described herein again.

Step 203: The terminal device sends a first message to the network device, where the first message includes a random access preamble and uplink data, the random access preamble is sent on a physical random access channel (PRACH), and the uplink data is sent on one or more of the plurality of first PUSCH occasions.

The network device receives the first message sent by the terminal device. The network device may receive the random access preamble on the PRACH, and receive the uplink data on the one or more of the plurality of first PUSCH occasions.

The first message may be a message A (MsgA) in a two-step random access process. For example, when the terminal device needs to send uplink data in a case without uplink synchronization, the terminal device may send, according to step 203, the random access preamble and the uplink data on a resource configured based on the first information. Compared with those in a four-step random access process, signaling overheads and an uplink data transmission latency can be reduced. In addition, the first PUSCH occasions configured based on the first information have the following features: All time domain symbols of each first PUSCH occasion are in a same slot, and a time domain interval between at least two adjacent first PUSCH occasions in the plurality of first PUSCH occasions is greater than or equal to a guard period configured based on the guard period configuration information. This can prevent a first PUSCH occasion from being cross-slot, and avoid interference between adjacent first PUSCH occasions that is caused due to asynchronization between the terminal device and the network device.

Step 204: The network device sends a second message to the terminal device, where the second message is used to indicate whether a random access process succeeds.

The terminal device receives the second message sent by the network device. The terminal device may determine, based on the second message, whether the random access process succeeds. The second message may be a response message. For example, the response message may be a message B (MsgB) in the two-step random access process. The response message may further carry information such as subsequent uplink transmission resource allocation information (UL grant) and timing advance, which are not illustrated one by one in this embodiment of this application.

In this embodiment, the network device sends the first information to the terminal device, and the terminal device determines the time domain resources of the plurality of first PUSCH occasions based on the first information. All time domain symbols of each first PUSCH occasion are in a same slot, and the time domain interval between the at least two adjacent first PUSCH occasions in the plurality of first PUSCH occasions is greater than or equal to the guard period configured based on the guard period configuration information. The terminal device sends the first message to the network device. The first message includes the random access preamble and the uplink data. The random access preamble is sent on the physical random access channel, and the uplink data is sent on the one or more of the plurality of first PUSCH occasions. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Based on any one of the foregoing embodiments, in some embodiments, a time domain resource length of each of the plurality of first PUSCH occasions configured based on the first information is greater than or equal to a first time domain length threshold. In some embodiments, a time domain resource length of each of the plurality of first PUSCH occasions configured based on the first information is greater than a first time domain length threshold. The first time domain length threshold may be represented by X, and a value of X may be 1, 2, 3, or the like. The value of X may be flexibly set based on a requirement, and X may be measured by a symbol quantity. A specific value of X may be predefined or may be configured by the network device. Time domain resource lengths of different first PUSCH occasions in the plurality of first PUSCH occasions may be equal, or may be unequal. If the first time domain length threshold is not predefined and the network device does not configure the first time domain length threshold, it is considered by default that the first time domain length threshold is 0, that is, it is considered by default that time domain resource lengths of all PUSCH occasions are greater than the first time domain length threshold. In other words, in this case, all steps of comparing a time domain resource length of a PUSCH occasion with the first time domain length threshold may be omitted.

A time domain resource of each first PUSCH occasion determined based on the first information is greater than or equal to the first time domain length threshold. This can avoid a problem that coverage and decoding performance are reduced because a time domain resource of a first PUSCH occasion used for uplink data transmission is excessively small.

In some embodiments, a time domain interval between any two adjacent first PUSCH occasions in the plurality of first PUSCH occasions and a former PUSCH occasion in the any two adjacent first PUSCH occasions are in a same slot. For example, a time domain interval between the first PUSCH occasion (0) and the first PUSCH occasion (1) shown in FIG. 4 and the first PUSCH occasion (0) are in a same slot.

As described above, the first information may include the guard period configuration information and the time domain resource configuration information of the PUSCH occasion. In an implementation, the time domain resource configuration information of the PUSCH occasion may include configuration information of a time domain resource start position, configuration information of a time domain resource length of the PUSCH occasion, and a quantity Q of time division multiplexed PUSCH occasions. The configuration information of the time domain resource start position is used to configure a start position of the time domain resources of the plurality of first PUSCH occasions. The configuration information of the time domain resource start position may include start slot configuration information and/or start symbol configuration information. For example, the start slot configuration information may be used to determine a start slot sequence number, the start symbol configuration information may be used to determine a start symbol sequence number(S), the start slot sequence number is used to determine the first slot in which the plurality of first PUSCH occasions are located, and the start symbol sequence number(S) is used to determine a sequence number of the first symbol of the plurality of first PUSCH occasions in the start slot. The configuration information of the time domain resource start position may be a time offset with respect to a PRACH time domain resource, or may be a periodicity and a time offset with respect to a system frame number (system frame number, SFN) equal to 0. This is not limited in the solutions in this embodiment of this application. The configuration information of the time domain resource length of the PUSCH occasion is used to configure the time domain resource length (L) of the PUSCH occasion. A specific value of L may be flexibly set based on a requirement. For example, L is set to 5, and L may be measured by a symbol quantity. The quantity Q of time division multiplexed PUSCH occasions is used to determine a quantity of first PUSCH occasions configured based on the first information. A finally determined actual quantity of first PUSCH occasions may not be equal to Q, and a specific value of Q may be flexibly set based on a requirement. For example, Q is set to 4. In some embodiments, some information in the configuration information of the time domain resource start position, the configuration information of the time domain resource length of the PUSCH occasion, and the quantity Q of time division multiplexed PUSCH occasions may be jointly coded. For example, the start symbol sequence number(S) in the configuration information of the time domain resource start position and the time domain resource length (L) of the PUSCH occasion may be jointly coded into one parameter.

Figures 6, 7A, 7B, 7C:
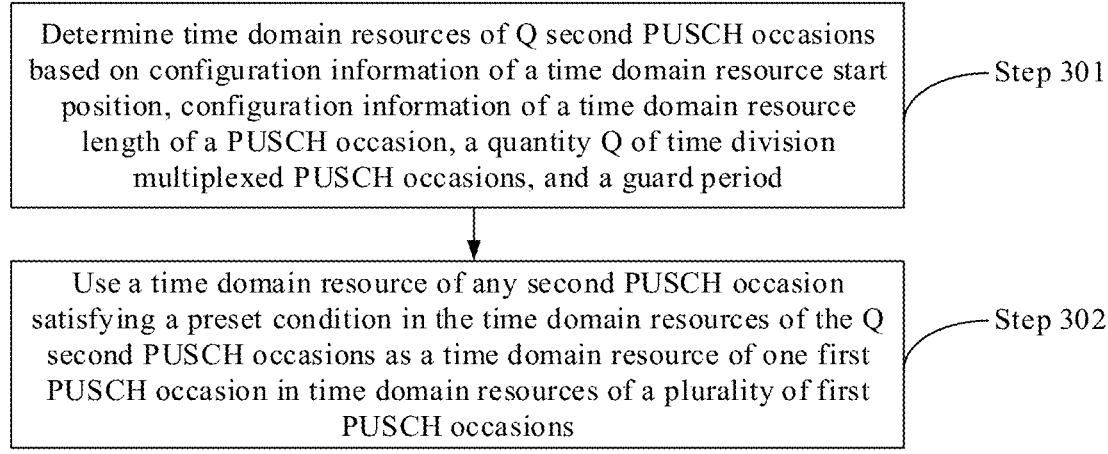
FIG. 6 is a flowchart of another uplink transmission time domain resource determining method according to an embodiment of this application.
FIG. 7A is a schematic diagram of a time domain resource of a PUSCH occasion according to an embodiment of this application.
FIG. 7B is a schematic diagram of a time domain resource of another PUSCH occasion according to an embodiment of this application.
FIG. 7C is a schematic diagram of a time domain resource of another PUSCH occasion according to an embodiment of this application.

FIG. 6 is a flowchart of another uplink transmission time domain resource determining method according to an embodiment of this application. This embodiment is a specific implementation of step 102 or step 202 in the foregoing embodiment. First information in this embodiment includes guard period configuration information and time domain resource configuration information of a PUSCH occasion. The time domain resource configuration information of the PUSCH occasion may include configuration information of a time domain resource start position, configuration information of a time domain resource length of the PUSCH occasion, and a quantity Q of time division multiplexed PUSCH occasions. As shown in FIG. 6, the method in this embodiment may include the following steps.

Step 301: Determine time domain resources of Q second PUSCH occasions based on the configuration information of the time domain resource start position, the configuration information of the time domain resource length of the PUSCH occasion, the quantity Q of time division multiplexed PUSCH occasions, and a guard period.

There is a guard period separating any two adjacent second PUSCH occasions in the time domain resources of the Q second PUSCH occasions, and the time domain resources of the Q second PUSCH occasions and Q guard periods are continuously distributed in time domain.

In this embodiment, different second PUSCH occasions in the time domain resources of the Q second PUSCH occasions are distinguished by using time domain sequence numbers. For example, time domain resources of four (Q=4) second PUSCH occasions include a PUSCH occasion #0, a PUSCH occasion #1, a PUSCH occasion #2, and a PUSCH occasion #3, and time domain sequence numbers are 0, 1, 2, and 3. A start position of a time domain resource of a second PUSCH occasion whose time domain sequence number is i (i>0) may be represented as $t_i = t_{i-1} + L_{i-1} + N_{GP,i-1}$, where $t_{i-1}$, $L_{i-1}$, and $N_{GP,i-1}$ are respectively a time domain start position, a time domain length, and a guard period length of a second PUSCH occasion whose time domain sequence number is i-1. In another representation method, a start position of a time domain resource of a second PUSCH occasion whose time domain sequence number is i (i>0) is a symbol $H_1$ in a slot H, where $$H = n_{i-1} + \left\lfloor \frac{L_{i-1} + N_{GP,i-1} + S_{i-1}}{N_{symb}^{slot}} \right\rfloor,$$

$H_1 = \mod(L_{i-1} + N_{GP,i-1} + S_{i-1}, N_{symb}^{slot})$, $n_{i-1}$ and $S_{i-1}$ are respectively a sequence number of a slot in which a time domain start position of a second PUSCH occasion whose time domain sequence number is i-1 is located and a sequence number of a start symbol in the slot, and $N_{symb}^{slot}$ is a quantity of symbols in each slot. Time domain lengths of all second PUSCH occasions are equal to a time domain length L indicated by the configuration information of the time domain resource length of the PUSCH occasion, and lengths of all guard periods are equal to a guard period length $N_{GP}$ indicated by the guard period configuration information, that is, $L_i = L$, and $N_{GP,i} = N_{GP}$. In this case, the start position of the time domain resource of the second PUSCH occasion whose time domain sequence number is i (i≥0) is a symbol $J_1$ in a slot J, $$J = n + \left\lfloor \frac{(L + N_{GP}) * i + S}{N_{symb}^{slot}} \right\rfloor,$$

and $J_1 = \mod((L + N_{GP}) * i + S, N_{symb}^{slot})$, where mod represents remainder calculation, mod (A, B) is equal to a remainder of dividing A by B, n is a sequence number of a start slot used to configure a second PUSCH occasion, and n may be determined based on start slot configuration information in the time domain resource configuration information.

After the time domain resources of the Q second PUSCH occasions are determined, a time domain resource of a first PUSCH occasion may be determined according to the following step.

Step 302: Use a time domain resource of any second PUSCH occasion satisfying a preset condition in the time domain resources of the Q second PUSCH occasions as a time domain resource of one first PUSCH occasion in time domain resources of a plurality of first PUSCH occasions.

The preset condition in this embodiment may include: All time domain symbols of the second PUSCH occasion are in a same slot; or all time domain symbols of the second PUSCH occasion and a guard period after the second PUSCH occasion are in a same slot.

One or more PUSCH occasions in the Q second PUSCH occasions satisfy the preset condition in this embodiment. Any second PUSCH occasion satisfying the preset condition may be used as a first PUSCH occasion, and any second PUSCH occasion that does not satisfy the preset condition may be used as an invalid first PUSCH occasion. Alternatively, a second PUSCH occasion that does not satisfy the preset condition is adjusted, in another manner such as a shortening manner or a splitting manner, to a PUSCH occasion satisfying the preset condition. A manner for processing a second PUSCH occasion that does not satisfy the preset condition may be predefined, or may be indicated by using signaling.

In some embodiments, for a second PUSCH occasion that does not satisfy the preset condition in the Q second PUSCH occasions, a first PUSCH occasion may be determined by using at least one of the following:

if a first part of time domain symbols and a second part of time domain symbols that are of the second PUSCH occasion are respectively in two adjacent slots, and a quantity of the first part of time domain symbols of the second PUSCH occasion is greater than or equal to a sum of a first time domain length threshold and the guard period, first N time domain symbols in the first part of time domain symbols of the second PUSCH occasion are a time domain resource of one of the plurality of first PUSCH occasions; or if a first part of time domain symbols and a second part of time domain symbols that are of the second PUSCH occasion are respectively in two adjacent slots, and a quantity of the first part of time domain symbols of the second PUSCH occasion is greater than a sum of a first time domain length threshold and the guard period, first N time domain symbols in the first part of time domain symbols of the second PUSCH occasion are a time domain resource of one of the plurality of first PUSCH occasions, where the first part of time domain symbols of the second PUSCH occasion is in a former slot in the two adjacent slots, for example, the first part of time domain symbols may be all time domain symbols that are of the second PSCH occasion and that are in the former slot in the two adjacent slots; the second part of time domain symbols of the second PUSCH occasion is in a latter slot in the two adjacent slots, for example, the first part of time domain symbols may be all time domain symbols that are of the second PSCH occasion and that are in the latter slot in the two adjacent slots; and N is a difference between the quantity of the first part of time domain symbols of the second PUSCH occasion and the guard period; and/or if a quantity of the second part of time domain symbols of the second PUSCH occasion is greater than or equal to the first time domain length threshold, the second part of time domain symbols of the second PUSCH occasion is a time domain resource of one of the plurality of first PUSCH occasions.

For example, when all symbols of the second PUSCH occasion whose time domain sequence number is i and the guard period are in one slot, or all symbols of the second PUSCH occasion whose time domain sequence number is i are in one slot, the second PUSCH occasion whose time domain sequence number is i is used as a first PUSCH occasion; otherwise, $L_i$ and/or $N_{GP,i}$ may be adjusted in a shortening manner, a splitting manner, or the like as described above, to ensure that a time domain resource of the second PUSCH occasion whose time domain sequence number is i satisfies the preset condition after the adjustment.

In this embodiment, a network device sends first information to a terminal device, the terminal device determines the time domain resources of the Q second PUSCH occasions based on the configuration information of the time domain resource start position, the configuration information of the time domain resource length of the PUSCH occasion, the quantity Q of time division multiplexed PUSCH occasions, and the guard period, and the terminal device uses the time domain resource of the any second PUSCH occasion satisfying the preset condition in the time domain resources of the Q second PUSCH occasions as the time domain resource of one first PUSCH occasion in the time domain resources of the plurality of first PUSCH occasions. The preset condition may include: All time domain symbols of the second PUSCH occasion are in a same slot; or all time domain symbols of the second PUSCH occasion and a guard period after the second PUSCH occasion are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

For a second PUSCH occasion that does not satisfy the preset condition in this embodiment, the second PUSCH occasion that does not satisfy the preset condition may be adjusted, in a shortening manner, a splitting manner, or the like, to a PUSCH occasion satisfying the preset condition, so that time domain resource utilization can be improved.

The embodiment shown in FIG. 6 is described below by using examples in scenarios of different values of a start slot sequence number included in the configuration information of the time domain resource start position, L configured based on the configuration information of the time domain resource length of the PUSCH occasion, the quantity Q of time division multiplexed PUSCH occasions, the guard period $N_{GP}$, and the first time domain length threshold X.

Scenario 1: The configuration information of the time domain resource start position includes a start slot sequence number n, L configured based on the configuration information of the time domain resource length of the PUSCH occasion is equal to 5, Q=4, the guard period $N_{GP}$ is equal to 1, X=2, and $N_{symb}^{slot}$ is 14. Step 301 and step 302 in the embodiment shown in FIG. 6 are described by using the scenario 1.

FIG. 7A is a schematic diagram of a time domain resource of a PUSCH occasion according to an embodiment of this application. The terminal device may determine, by using step 301, time domain resources of four (Q=4) second PUSCH occasions shown in FIG. 7A: a PUSCH occasion #0, a PUSCH occasion #1, a PUSCH occasion #2, and a PUSCH occasion #3. Because only the start slot sequence number n is configured based on the configuration information of the time domain resource start position, a default start symbol may be used. For example, in this embodiment, the default start symbol is 0, that is, the first available symbol in a start slot. As shown in FIG. 7A, a start position of the PUSCH occasion #0 is a symbol #0 of a slot n, a start position of the PUSCH occasion #1 is a symbol #6 of the slot n, a start position of the PUSCH occasion #2 is a symbol #12 of the slot n, and a start position of the PUSCH occasion #3 is a symbol #4 of a slot n+1. A symbol #5 of the slot n is a guard period between the PUSCH occasion #0 and the PUSCH occasion #1, a symbol #11 of the slot n is a guard period between the PUSCH occasion #1 and the PUSCH occasion #2, and a symbol #3 of the slot n+1 is a guard period between the PUSCH occasion #2 and the PUSCH occasion #3.

The terminal device may use each of the PUSCH occasion #0, the PUSCH occasion #1, and the PUSCH occasion #3 as a time domain resource of one first PUSCH occasion in the time domain resources of the plurality of first PUSCH occasions by using step 302.

The PUSCH occasion #2 that does not satisfy the preset condition in the embodiment shown in FIG. 6 may be processed in any one of the following three manners.

Manner 1: The terminal device may use the PUSCH occasion #2 as an invalid first PUSCH occasion, that is, the invalid first PUSCH occasion is not used to transmit uplink data.

Manner 2: The terminal device may split the PUSCH occasion #2 into one or two first PUSCH occasions satisfying the preset condition.

Description of the manner 2 is as follows: FIG. 7B is a schematic diagram of a time domain resource of another PUSCH occasion according to an embodiment of this application. FIG. 7B is a schematic diagram of a result of adjusting, in the manner 2, the second PUSCH occasion (the PUSCH occasion #2) that does not satisfy the preset condition in FIG. 7A. As shown in FIG. 7A, a first part of time domain symbols (the symbol #12 and a symbol #13 of the slot n) and a second part of time domain symbols (a symbol 0 to a symbol 2 of the slot n+1) of the PUSCH occasion #2 are respectively in two adjacent slots (the slot n and the slot n+1), that is, the PUSCH occasion #2 is cross-slot. In this case, the PUSCH occasion #2 is split into two PUSCH occasions (a PUSCH occasion #2 and a PUSCH occasion #3 shown in FIG. 7B) based on a slot boundary, and there is a guard period (the symbol #13 of the slot n) separating the two PUSCH occasions. As shown in FIG. 7A, because a quantity (2) of the first part of time domain symbols of the PUSCH occasion #2 is less than a sum of the first time domain length threshold (X=2) and the guard period ($N_{GP}$=1), a time domain resource length (1) of the PUSCH occasion #2 shown in FIG. 7B that is obtained after the splitting is less than the first time domain length threshold (X=2). Therefore, the PUSCH occasion #2 shown in FIG. 7B is not used as a valid first PUSCH occasion. As shown in FIG. 7A, because a quantity (3) of the second part of time domain symbols of the PUSCH occasion #2 is greater than the first time domain length threshold (X=2), a time domain resource length (3) of the PUSCH occasion #3 shown in FIG. 7B that is obtained after the splitting is greater than the first time domain length threshold (X=2). Therefore, the PUSCH occasion #3 shown in FIG. 7B may be used as a first PUSCH occasion. A guard period between the PUSCH occasion #1 and the PUSCH occasion #3 is the symbol #11 to the symbol #13 of the slot n.

The terminal device may split a cross-slot second PUSCH occasion into one or two first PUSCH occasions satisfying the preset condition.

Manner 3: The terminal device may shorten a time domain length of the PUSCH occasion #2 to obtain a first PUSCH occasion satisfying the preset condition.

Description of the manner 3 is as follows: FIG. 7C is a schematic diagram of a time domain resource of another PUSCH occasion according to an embodiment of this application. FIG. 7C is a schematic diagram of a result of adjusting, in the manner 3, the second PUSCH occasion (the PUSCH occasion #2) that does not satisfy the preset condition in FIG. 7A. As shown in FIG. 7A, a first part of time domain symbols (the symbol #12 and a symbol #13 of the slot n) and a second part of time domain symbols (a symbol 0 to a symbol 2 of the slot n+1) of the PUSCH occasion #2 are respectively in two adjacent slots (the slot n and the slot n+1), that is, the PUSCH occasion #2 is cross-slot. In this case, a time domain resource length of the PUSCH occasion #2 is shortened, so that a shortened PUSCH occasion #2 and a guard period after the shortened PUSCH occasion #2 are in a same slot. With reference to FIG. 7C, the shortened PUSCH occasion #2 and the guard period after the shortened PUSCH occasion #2 are in the slot n, the last symbol of the guard period is the last symbol of the slot n, the PUSCH occasion #3 starts from the first symbol of the slot n+1, and a time domain resource length of the PUSCH occasion #3 remains unchanged. If a time domain resource length of the shortened PUSCH occasion #2 is greater than or equal to the first time domain length threshold (X=2), the shortened PUSCH occasion #2 may be used as a first PUSCH occasion. However, in this embodiment, as shown in FIG. 7C, the time domain resource length of the shortened PUSCH occasion #2 is less than the first time domain length threshold (X=2). In this case, the shortened PUSCH occasion #2 is an invalid first PUSCH occasion, and the shortened PUSCH occasion #2 is not used to send uplink data.

In this embodiment, a second PUSCH occasion with a cross-slot time domain resource may be processed in any one of the foregoing manners, so that the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Scenario 2: The configuration information of the time domain resource start position includes a start slot sequence number n, a start symbol S is equal to 0, L configured based on the configuration information of the time domain resource length of the PUSCH occasion is equal to 4, Q=4, the guard period $N_{GP}$ is equal to 1, X=2, and $N_{symb}^{slot}$=14. Step 301 and step 302 in the embodiment shown in FIG. 6 are described by using the scenario 2.

FIG. 8A is a schematic diagram of a time domain resource of another PUSCH occasion according to an embodiment of this application. The terminal device may determine, by using step 301, time domain resources of four (Q=4) second PUSCH occasions shown in FIG. 8A: a PUSCH occasion #0, a PUSCH occasion #1, a PUSCH occasion #2, and a PUSCH occasion #3. As shown in FIG. 8A, a start position of the PUSCH occasion #0 is a symbol #0 of a slot #n, a start position of the PUSCH occasion #1 is a symbol #5 of the slot #n, a start position of the PUSCH occasion #2 is a symbol #10 of the slot #n, and a start position of the PUSCH occasion #3 is a symbol #1 of a slot #n+1.

For example, the preset condition in the embodiment shown in FIG. 6 is that all time domain symbols of the second PUSCH occasion are in a same slot. The terminal device may use each of the PUSCH occasion #0, the PUSCH occasion #1, the PUSCH occasion #2, and the PUSCH occasion #3 as a time domain resource of one first PUSCH occasion in the time domain resources of the plurality of first PUSCH occasions by using step 302. In other words, all the second PUSCH occasions in FIG. 8A satisfy the preset condition.

For example, the preset condition in the embodiment shown in FIG. 6 is that all time domain symbols of the second PUSCH occasion and a guard period after the second PUSCH occasion are in a same slot. The terminal device may use each of the PUSCH occasion #0, the PUSCH occasion #1, and the PUSCH occasion #3 as a time domain resource of one first PUSCH occasion in the time domain resources of the plurality of first PUSCH occasions by using step 302. The PUSCH occasion #2 that does not satisfy the preset condition may be processed in either of the following two manners.

Manner 1: The terminal device may use the PUSCH occasion #2 as an invalid first PUSCH occasion, that is, the invalid first PUSCH occasion is not used to transmit uplink data.

Manner 2: The terminal device may shorten a time domain length of the PUSCH occasion #2 to obtain a first PUSCH occasion satisfying the preset condition.

Description of the manner 2 is as follows: FIG. 8B is a schematic diagram of a time domain resource of another PUSCH occasion according to an embodiment of this application. FIG. 8B is a schematic diagram of a result of adjusting, in the manner 2, the second PUSCH occasion (the PUSCH occasion #2) that does not satisfy the preset condition in FIG. 8A. As shown in FIG. 8A, the PUSCH occasion #2 and a guard period after the PUSCH occasion #2 are in different slots. In this case, a time domain resource length of the PUSCH occasion #2 is shortened, so that a shortened PUSCH occasion #2 and a guard period after the shortened PUSCH occasion #2 are in a same slot. With reference to FIG. 8B, the shortened PUSCH occasion #2 and the guard period after the shortened PUSCH occasion #2 are in the slot n, the guard period ends on the last symbol of the slot n, the PUSCH occasion #3 starts from the first symbol of the slot n+1, and a time domain resource length of the PUSCH occasion #3 remains unchanged. The time domain resource length (3) of the shortened PUSCH occasion #2 is greater than the first time domain length threshold (X=2). In this case, the shortened PUSCH occasion #2 is used as a first PUSCH occasion.

It should be noted that, in FIG. 8B, that a start position of the PUSCH occasion #3 after the shortened PUSCH occasion #2 is a symbol #0 of the slot #n+1 is an example for description. It may be understood that if a start symbol configured based on the configuration information of the time domain resource start position or a default start symbol is a non-0 value such as 1, the start position of the PUSCH occasion #3 may be the symbol #1 of the slot #n+1.

In this embodiment, for a second PUSCH occasion, if a time domain resource of the second PUSCH occasion and a guard period after the second PUSCH occasion are in different slots, the second PUSCH occasion may be processed in either of the foregoing manners, so that the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Scenario 3: The configuration information of the time domain resource start position includes a start slot sequence number n, a start symbol S is equal to 0, L configured based on the configuration information of the time domain resource length of the PUSCH occasion is equal to 3, Q=4, the guard period $N_{GP}$ is equal to 2, X=2, and $N_{symb}^{slot}$=14. Step 301 and step 302 in the embodiment shown in FIG. 6 are described by using the scenario 3.

FIG. 9A is a schematic diagram of a time domain resource of another PUSCH occasion according to an embodiment of this application. The terminal device may determine, by using step 301, time domain resources of four (Q=4) second PUSCH occasions shown in FIG. 9A: a PUSCH occasion #0, a PUSCH occasion #1, a PUSCH occasion #2, and a PUSCH occasion #3. As shown in FIG. 9A, a start position of the PUSCH occasion #0 is a symbol #0 of a slot #n, a start position of the PUSCH occasion #1 is a symbol #5 of the slot #n, a start position of the PUSCH occasion #2 is a symbol #10 of the slot #n, and a start position of the PUSCH occasion #3 is a symbol #1 of a slot #n+1.

For example, the preset condition in the embodiment shown in FIG. 6 is that all time domain symbols of the second PUSCH occasion are in a same slot. The terminal device may use each of the PUSCH occasion #0, the PUSCH occasion #1, the PUSCH occasion #2, and the PUSCH occasion #3 as a time domain resource of one first PUSCH occasion in the time domain resources of the plurality of first PUSCH occasions by using step 302. In other words, all the second PUSCH occasions in FIG. 9A satisfy the preset condition.

For example, the preset condition in the embodiment shown in FIG. 6 is that all time domain symbols of the second PUSCH occasion and a guard period after the second PUSCH occasion are in a same slot. The terminal device may use each of the PUSCH occasion #0, the PUSCH occasion #1, and the PUSCH occasion #3 as a time domain resource of one first PUSCH occasion in the time domain resources of the plurality of first PUSCH occasions by using step 302. The PUSCH occasion #2 that does not satisfy the preset condition may be processed in either of the following two manners.

Manner 1: The terminal device may use the PUSCH occasion #2 as an invalid first PUSCH occasion, that is, the invalid first PUSCH occasion is not used to transmit uplink data.

Manner 2: The terminal device may shorten a guard period after the PUSCH occasion #2, so that the PUSCH occasion #2 can satisfy the preset condition.

Description of the manner 2 is as follows: FIG. 9B is a schematic diagram of a time domain resource of another PUSCH occasion according to an embodiment of this application. FIG. 9B is a schematic diagram of a result of adjusting, in the manner 2, the second PUSCH occasion (the PUSCH occasion #2) that does not satisfy the preset condition in FIG. 9A. As shown in FIG. 9A, not all symbols of the guard period after the PUSCH occasion #2 are in a same slot. In this case, a time domain resource length of the guard period after the PUSCH occasion #2 is shortened, so that the PUSCH occasion #2 and a shortened guard period after the PUSCH occasion #2 are in a same slot. With reference to FIG. 9B, the PUSCH occasion #2 and the shortened guard period after the PUSCH occasion #2 are in the slot n, the guard period ends on the last symbol of the slot n, the PUSCH occasion #3 starts from the first symbol of the slot n+1, and a time domain resource length of a guard period after the PUSCH occasion #3 remains unchanged. Because a time domain resource length (3) of the PUSCH occasion #2 is greater than the first time domain length threshold (X=2), the PUSCH occasion #2 may be used as a first PUSCH occasion.

It should be noted that, in FIG. 9B, that a start position of the PUSCH occasion #3 after the shortened PUSCH occasion #2 is a symbol #0 of the slot #n+1 is an example for description. It may be understood that if a start symbol configured based on the configuration information of the time domain resource start position or a default start symbol is a non-0 value such as 1, the start position of the PUSCH occasion #3 may be the symbol #1 of the slot #n+1.

In this embodiment, for a second PUSCH occasion, if a guard period after the second PUSCH occasion is cross-slot, the second PUSCH occasion may be processed in either of the foregoing manners, so that the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Based on any one of the foregoing embodiments, the first information in this application may further include frequency domain resource configuration information of the PUSCH occasion. For example, the frequency domain resource configuration information may be used to configure a quantity F of frequency domain resources of frequency division multiplexed PUSCH occasions.

The uplink transmission time domain resource determining method in this embodiment of this application may further be used to combine D frequency domain resources of an adjusted second PUSCH occasion that are adjacent in frequency domain into one PUSCH occasion. A value of D may be predefined or may be configured by the network device.

Figures 10A, 10B:
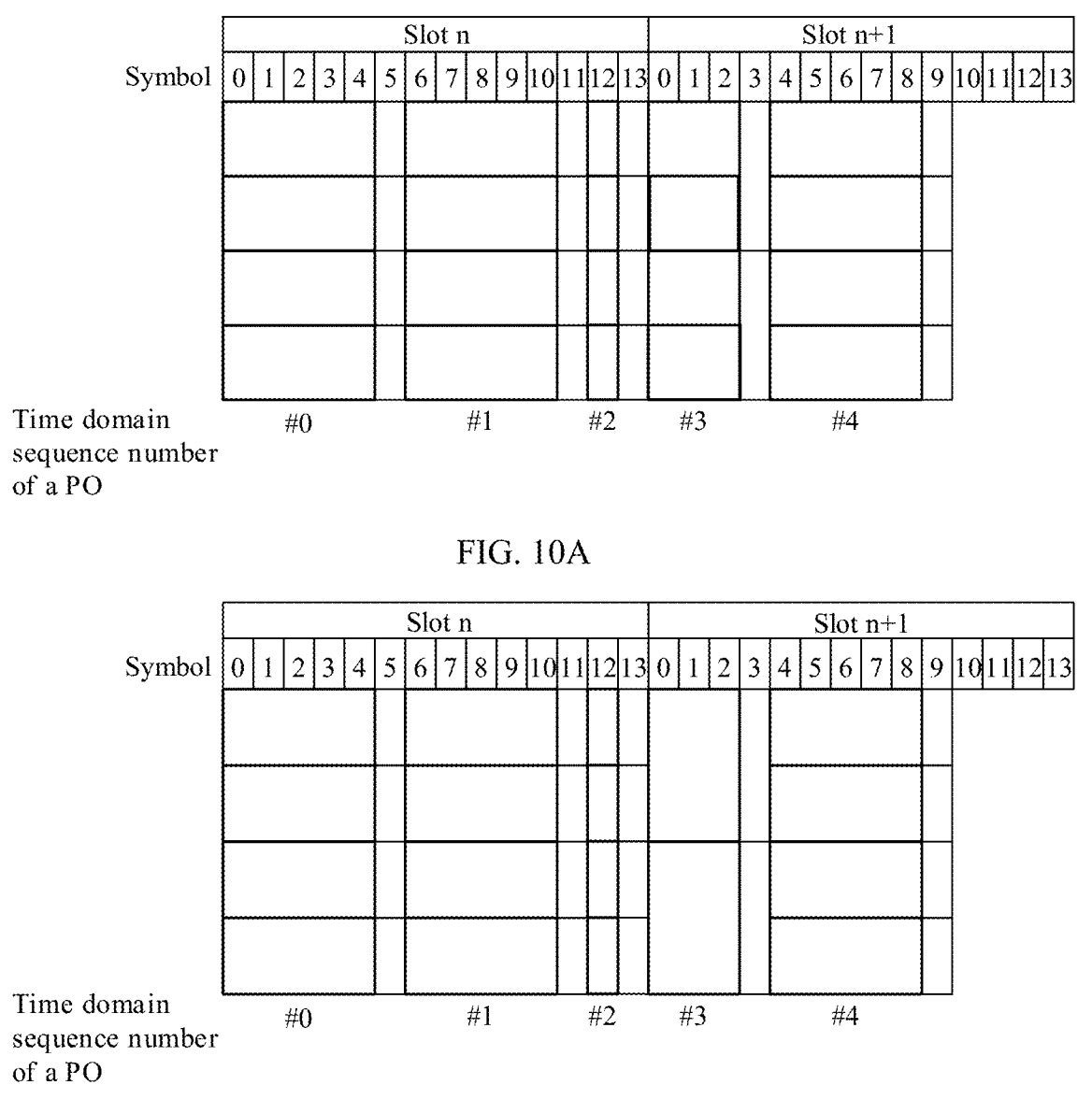

FIG. 7B is used as an example for further description. Based on FIG. 7B, in this embodiment, if F=4 and D=2, a schematic diagram of a time-frequency domain resource of a PUSCH occasion obtained by using step 301 and step 302 may be FIG. 10A. After processing in step 301 and step 302, as shown in FIG. 10A, a PUSCH occasion #0, a PUSCH occasion #1, a PUSCH occasion #3, and a PUSCH occasion #4 are time domain resources of four first PUSCH occasions, and on a time domain resource of each first PUSCH occasion, there are four (F=4) frequency domain resources of the first PUSCH occasion. In this embodiment, based on the foregoing embodiment, two (D=2) frequency domain resources that are contiguous in frequency domain may further be combined into one frequency domain resource. For example, for a combination result, refer to FIG. 10B. From a smallest position in frequency domain resources of the PUSCH occasion #3, two frequency domain resources that are contiguous in frequency domain are combined into one frequency domain resource, to obtain adjusted frequency domain resources of the PUSCH occasion #3. Each adjusted frequency domain resource of the PUSCH occasion #3 has two PUSCH occasion resources with increased frequency domain widths, and bandwidth of each adjusted frequency domain resource of the PUSCH occasion #3 is twice as much as that before the adjustment.

In this embodiment, frequency domain resources of an adjusted second PUSCH occasion are combined, to avoid a problem that coverage and decoding performance are reduced because a time domain resource of a first PUSCH occasion used for uplink data transmission is excessively small, and increase transmission bandwidth of the PUSCH occasion, so that an uplink data transmission rate can be improved.

It should be noted that, in the foregoing embodiments in which a second PUSCH occasion is adjusted, all first PUSCH occasions have a same TBS, which is equal to a TBS of a first PUSCH occasion that is not adjusted. For a first PUSCH occasion in which a time domain resource or a frequency domain resource changes, a modulation and coding scheme (Modulation and Coding Scheme, MCS) of the first PUSCH occasion may be correspondingly adjusted based on a resource size of the adjusted first PUSCH occasion.

As described above, the first information may include the guard period configuration information and the time domain resource configuration information of the PUSCH occasion. The time domain resource configuration information of the PUSCH occasion may include the configuration information of the time domain resource start position, the configuration information of the time domain resource length of the PUSCH occasion, and the quantity Q of time division multiplexed PUSCH occasions. For a specific description thereof, refer to the foregoing embodiment. Details are not described herein again. Based on this, the time domain resource configuration information in this application may further include a quantity K of repetition times. The quantity K of repetition times represents a quantity of consecutive third PUSCH occasions in one PUSCH occasion group. There is no time interval between time domain resources of third PUSCH occasions in each PUSCH occasion group, and an interval between time domain resources of two adjacent PUSCH occasion groups is greater than or equal to the guard period.

FIG. 11 is a flowchart of another uplink transmission time domain resource determining method according to an embodiment of this application. This embodiment is another specific implementation of step 102 or step 202 in the foregoing embodiment. First information in this embodiment includes guard period configuration information and time domain resource configuration information of a PUSCH occasion. The time domain resource configuration information of the PUSCH occasion may include configuration information of a time domain resource start position, configuration information of a time domain resource length of the PUSCH occasion, a quantity Q of time division multiplexed PUSCH occasions, and a quantity K of repetition times. As shown in FIG. 11, the method in this embodiment may include the following steps.

Step 401: Determine time domain resources of Q PUSCH occasion groups based on the configuration information of the time domain resource start position, the configuration information of the time domain resource length of the PUSCH occasion, the quantity Q of time division multiplexed PUSCH occasions, a guard period, and the quantity K of repetition times.

Each PUSCH occasion group includes K consecutive third PUSCH occasions in time domain, and an interval between time domain resources of two adjacent PUSCH occasion groups is greater than or equal to the guard period.

To be specific, there is a guard period separating any two adjacent PUSCH occasion groups in the time domain resources of the Q PUSCH occasion groups, and the time domain resources of the Q PUSCH occasion groups and Q guard periods are continuously distributed in time domain.

After the time domain resources of the Q PUSCH occasion groups are determined, a time domain resource of a first PUSCH occasion may be determined according to the following step.

Step 402: Use a time domain resource of any third PUSCH occasion satisfying a preset condition in the Q PUSCH occasion groups as a time domain resource of one first PUSCH occasion in time domain resources of a plurality of first PUSCH occasions.

The preset condition in this embodiment may include: All time domain symbols of the third PUSCH occasion are in a same slot; or all time domain symbols of the third PUSCH occasion and the first guard period after the third PUSCH occasion are in a same slot if the third PUSCH occasion is the last third PUSCH occasion in a PUSCH occasion group in which the third PUSCH occasion is located, or all time domain symbols of the third PUSCH occasion are in a same slot if the third PUSCH occasion is not the last third PUSCH occasion in a PUSCH occasion group in which the third PUSCH occasion is located.

One or more third PUSCH occasions in the Q PUSCH occasion groups satisfy the preset condition in this embodiment. Any third PUSCH occasion satisfying the preset condition may be used as a first PUSCH occasion, and any third PUSCH occasion that does not satisfy the preset condition may be used as an invalid first PUSCH occasion. Alternatively, a third PUSCH occasion that does not satisfy the preset condition is adjusted, in another manner such as a shortening manner or a splitting manner, to a PUSCH occasion satisfying the preset condition. A manner for processing a third PUSCH occasion that does not satisfy the preset condition may be predefined, or may be indicated by using signaling.

In some embodiments, for the third PUSCH occasion that does not satisfy the preset condition in the Q PUSCH occasion groups, a first PUSCH occasion may be determined in the following manner: If a first part of time domain symbols and a second part of time domain symbols of the third PUSCH occasion are respectively in two adjacent slots, and a quantity of the first part of time domain symbols of the third PUSCH occasion is greater than or equal to a first time domain length threshold, the first part of time domain symbols of the third PUSCH occasion is a time domain resource of one of the plurality of first PUSCH occasions, where the first part of time domain symbols of the third PUSCH occasion is in a former slot in the two adjacent slots, for example, the first part of time domain symbols is all time domain symbols that are of the third PUSCH occasion and that are in the former slot in the two adjacent slots; and the second part of time domain symbols of the third PUSCH occasion is in a latter slot in the two adjacent slots, for example, the second part of time domain symbols is all time domain symbols that are of the third PUSCH occasion and that are in the latter slot in the two adjacent slots. Based on the foregoing manner for processing the third PUSCH occasion that does not satisfy the preset condition in the Q PUSCH occasion groups, if a quantity of the second part of time domain symbols of the third PUSCH occasion is greater than or equal to the first time domain length threshold, the second part of time domain symbols of the third PUSCH occasion is used as a time domain resource of one of the plurality of first PUSCH occasions; or the second part of time domain symbols of the third PUSCH occasion and a time domain resource of the first third PUSCH occasion after the third PUSCH occasion are combined into a time domain resource of one of the plurality of first PUSCH occasions.

The third PUSCH occasion that does not satisfy the preset condition in the Q PUSCH occasion groups may be split in the foregoing processing manner, to obtain one or two PUSCH occasions satisfying the preset condition in this embodiment, and the one or two PUSCH occasions are used as first PUSCH occasions to transmit uplink data, so that time domain resource utilization can be improved.

Different from that in the foregoing manner, in some embodiments, for the third PUSCH occasion that does not satisfy the preset condition in the Q PUSCH occasion groups, if a first part of time domain symbols and a second part of time domain symbols of the third PUSCH occasion are respectively in two adjacent slots, the third PUSCH occasion is not the last third PUSCH occasion in a PUSCH occasion group in which the third PUSCH occasion is located, and a quantity of the first part of time domain symbols of the third PUSCH occasion is greater than or equal to the first time domain length threshold, a time domain length of the third PUSCH occasion is shortened to the quantity of the first part of symbols of the third PUSCH occasion, so that the shortened third PUSCH occasion satisfies the preset condition, and the shortened third PUSCH occasion is a time domain resource of one of the plurality of first PUSCH occasions; or if a first part of time domain symbols and a second part of time domain symbols of the third PUSCH occasion are respectively in two adjacent slots, the third PUSCH occasion is the last third PUSCH occasion in a PUSCH occasion group in which the third PUSCH occasion is located, and a quantity of the first part of time domain symbols of the third PUSCH occasion is greater than or equal to a sum of the first time domain length threshold and the guard period, a time domain length of the third PUSCH occasion is shortened to M symbols, so that the shortened third PUSCH occasion satisfies the preset condition, and the shortened third PUSCH occasion is a time domain resource of one of the plurality of first PUSCH occasions, where the first part of time domain symbols of the third PUSCH occasion is in a former slot in the two adjacent slots, the second part of time domain symbols of the third PUSCH occasion is in a latter slot in the two adjacent slots, and M is a difference between the quantity of the first part of time domain symbols of the third PUSCH occasion and the guard period.

The third PUSCH occasion that does not satisfy the preset condition in the Q PUSCH occasion groups may be shortened in the foregoing processing manner, to obtain a PUSCH occasion satisfying the preset condition in this embodiment, and the PUSCH occasion is used as a first PUSCH occasion to transmit uplink data, so that time domain resource utilization can be improved.

In this embodiment, a network device sends first information to a terminal device, and the terminal device determines the time domain resources of the Q PUSCH occasion groups based on the configuration information of the time domain resource start position, the configuration information of the time domain resource length of the PUSCH occasion, the quantity Q of time division multiplexed PUSCH occasions, the guard period, and the quantity K of repetition times, and uses the time domain resource of the any third PUSCH occasion satisfying the preset condition in the Q PUSCH occasion groups as the time domain resource of one first PUSCH occasion in the time domain resources of the plurality of first PUSCH occasions. The preset condition may include: All time domain symbols of the third PUSCH occasion are in a same slot; or all time domain symbols of the third PUSCH occasion and the first guard period after the third PUSCH occasion are in a same slot if the third PUSCH occasion is the last third PUSCH occasion in a PUSCH occasion group in which the third PUSCH occasion is located, or all time domain symbols of the third PUSCH occasion are in a same slot if the third PUSCH occasion is not the last third PUSCH occasion in a PUSCH occasion group in which the third PUSCH occasion is located. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Time domain resources of a plurality of third PUSCH occasions satisfying the preset condition in one PUSCH occasion group in this embodiment may be used to transmit a same transport block, to improve uplink data transmission quality.

For a third PUSCH occasion that does not satisfy the preset condition in this embodiment, the third PUSCH occasion that does not satisfy the preset condition may be adjusted, in a shortening manner, a splitting manner, or the like, to a PUSCH occasion satisfying the preset condition, so that time domain resource utilization can be improved. The embodiment shown in FIG. 11 is described below by using examples in scenarios of different values of a start slot sequence number included in the configuration information of the time domain resource start position, L configured based on the configuration information of the time domain resource length of the PUSCH occasion, the quantity Q of time division multiplexed PUSCH occasions, the guard period $N_{GP}$, the first time domain length threshold X, and the quantity K of repetition times.

Scenario 4: The configuration information of the time domain resource start position includes a start slot sequence number n, L configured based on the configuration information of the time domain resource length of the PUSCH occasion is equal to 4, Q=3, the guard period $N_{GP}$ is equal to 1, K=2, X=2, and $N_{symb}^{slot}$ is 14. Step 401 and step 402 in the embodiment shown in FIG. 11 are described by using the scenario 4.

In this embodiment, different PUSCH occasion groups in the time domain resources of the Q PUSCH occasion groups are distinguished by using time domain sequence numbers. For example, time domain resources of three (Q=3) PUSCH occasion groups include a PUSCH occasion group #0, a PUSCH occasion group #1, and a PUSCH occasion group #2, and time domain sequence numbers are 0, 1, and 2. K third PUSCH occasions are distinguished by using sequence numbers in each PUSCH occasion group. For example, the PUSCH occasion group #0 includes a PUSCH occasion #0 and a PUSCH occasion #1, the PUSCH occasion group #1 includes a PUSCH occasion #0 and a PUSCH occasion #1, and the PUSCH occasion group #2 includes a PUSCH occasion #0 and a PUSCH occasion #1.

FIG. 12A is a schematic diagram of a time domain resource of another PUSCH occasion according to an embodiment of this application. The terminal device may determine, by using step 401, time domain resources of three (Q=3) PUSCH occasion groups shown in FIG. 12A: a PUSCH occasion group #0, a PUSCH occasion group #1, a PUSCH occasion group #2, and a PUSCH occasion group #3. Because only the start slot sequence number n is configured based on the configuration information of the time domain resource start position, a default start symbol may be used. For example, in this embodiment, the default start symbol is 0, that is, the first available symbol in a start slot. As shown in FIG. 12A, a start position of the PUSCH occasion group #0 is a symbol #0 of a slot #n, a start position of the PUSCH occasion group #1 is a symbol #9 of the slot #n, and a start position of the PUSCH occasion group #2 is a symbol #4 of a slot #n+1.

The terminal device may use each of the PUSCH occasion #0 and the PUSCH occasion #1 in the PUSCH occasion group #0, the PUSCH occasion #0 in the PUSCH occasion group #1, and the PUSCH occasion #0 and the PUSCH occasion #1 in the PUSCH occasion group #3 as a time domain resource of one first PUSCH occasion in the time domain resources of the plurality of first PUSCH occasions by using step 402.

The PUSCH occasion #1 that is in the PUSCH occasion group #1 and that does not satisfy the preset condition in the embodiment shown in FIG. 11 may be processed in either of the following manners.

Manner 1: The terminal device may use the PUSCH occasion #1 in the PUSCH occasion group #1 as an invalid first PUSCH occasion, that is, the invalid first PUSCH occasion is not used to transmit uplink data.

Manner 2: The terminal device may split the PUSCH occasion #1 in the PUSCH occasion group #1 into one or two first PUSCH occasions satisfying the preset condition.

Description of the manner 2 is as follows: FIG. 12B is a schematic diagram of a time domain resource of another PUSCH occasion according to an embodiment of this application. FIG. 12B is a schematic diagram of a result of adjusting, in the manner 2, the third PUSCH occasion (the PUSCH occasion #1 in the PUSCH occasion group #1) that does not satisfy the preset condition in FIG. 12A. As shown in FIG. 12A, a first part of time domain symbols (a symbol #13 of the slot n) and a second part of time domain symbols (a symbol 0 to a symbol 2 of the slot n+1) of the PUSCH occasion #1 in the PUSCH occasion group #1 are respectively in two adjacent slots (the slot n and the slot n+1), that is, the PUSCH occasion #1 in the PUSCH occasion group #1 is cross-slot. In this case, the PUSCH occasion #1 in the PUSCH occasion group #1 is split into two PUSCH occasions (a PUSCH occasion #1 and a PUSCH occasion #2 in a PUSCH occasion group #1 shown in FIG. 12B) based on a slot boundary. As shown in FIG. 12A, because a quantity (1) of the first part of time domain symbols of the PUSCH occasion #1 in the PUSCH occasion group #1 is less than the first time domain length threshold (X=2), a time domain resource length (1) of the PUSCH occasion #1 in the PUSCH occasion group #1 shown in FIG. 12B that is obtained after the splitting is less than the first time domain length threshold (X=2). Therefore, the PUSCH occasion #1 in the PUSCH occasion group #1 shown in FIG. 12B is not used as a valid first PUSCH occasion. As shown in FIG. 12A, because a quantity (3) of the second part of time domain symbols of the PUSCH occasion #1 in the PUSCH occasion group #1 is greater than the first time domain length threshold (X=2), a time domain resource length (3) of the PUSCH occasion #2 in the PUSCH occasion group #1 shown in FIG. 12B that is obtained after the splitting is greater than the first time domain length threshold (X=2). Therefore, the PUSCH occasion #2 in the PUSCH occasion group #1 shown in FIG. 12B may be used as a first PUSCH occasion.

The terminal device may split a cross-slot third PUSCH occasion into one or two first PUSCH occasions satisfying the preset condition.

In this embodiment, a third PUSCH occasion with a cross-slot time domain resource may be processed in the foregoing manners, so that the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Scenario 5: The configuration information of the time domain resource start position includes a start slot sequence number n, L configured based on the configuration information of the time domain resource length of the PUSCH occasion is equal to 5, Q=2, the guard period $N_{GP}$ is equal to 1, K=2, X=2, and $N_{symb}^{slot}$ is 14. Step 401 and step 402 in the embodiment shown in FIG. 11 are described by using the scenario 5.

FIG. 13A is a schematic diagram of a time domain resource of another PUSCH occasion according to an embodiment of this application. The terminal device may determine, by using step 401, time domain resources of two (Q=2) PUSCH occasion groups shown in FIG. 13A: a PUSCH occasion group #0 and a PUSCH occasion group #1, and determine third PUSCH occasions in each group: a PUSCH occasion #0 and a PUSCH occasion #1 in the PUSCH occasion group #0, and a PUSCH occasion #0 and a PUSCH occasion #1 in the PUSCH occasion group #1. Because only the start slot sequence number n is configured based on the configuration information of the time domain resource start position, a default start symbol may be used. For example, in this embodiment, the default start symbol is 0, that is, the first available symbol in a start slot. As shown in FIG. 13A, a start position of the PUSCH occasion #0 in the PUSCH occasion group #0 is a symbol #0 of a slot #n, a start position of the PUSCH occasion #1 in the PUSCH occasion group #0 is a symbol #5 of the slot #n, a start position of the PUSCH occasion #0 in the PUSCH occasion group #1 is a symbol #11 of the slot #n, and a start position of the PUSCH occasion #1 in the PUSCH occasion group #1 is a symbol #2 of a slot #n+1.

The terminal device may use each of the PUSCH occasion #0 and the PUSCH occasion #1 in the PUSCH occasion group #0, and the PUSCH occasion #1 in the PUSCH occasion group #1 as a time domain resource of one first PUSCH occasion in the time domain resources of the plurality of first PUSCH occasions by using step 402. The PUSCH occasion #0 that is in the PUSCH occasion group #1 and that does not satisfy the preset condition may be processed in the following manner: The terminal device may shorten a time domain length of the PUSCH occasion #0 in the PUSCH occasion group #1 to obtain a first PUSCH occasion satisfying the preset condition.

Figures 13B, 14A, 14B, 15:
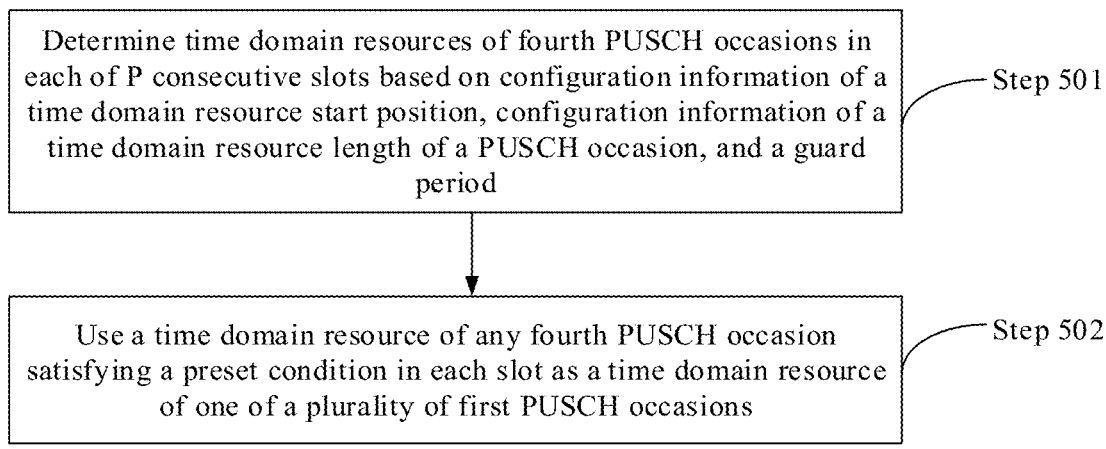
FIG. 13B is a schematic diagram of a time domain resource of another PUSCH occasion according to an embodiment of this application.
FIG. 14A is a schematic diagram of a time domain resource of another PUSCH occasion according to an embodiment of this application.
FIG. 14B is a schematic diagram of a time domain resource of another PUSCH occasion according to an embodiment of this application.
FIG. 15 is a flowchart of another uplink transmission time domain resource determining method according to an embodiment of this application.

For details, refer to FIG. 13B. FIG. 13B is a schematic diagram of a time domain resource of another PUSCH occasion according to an embodiment of this application. FIG. 13B is a schematic diagram of a result of adjusting the third PUSCH occasion (the PUSCH occasion #0 in the PUSCH occasion group #1) that does not satisfy the preset condition in FIG. 13A. As shown in FIG. 13A, a first part of time domain symbols (the symbol #11 to a symbol #13 of the slot n) and a second part of time domain symbols (a symbol 0 and a symbol 1 of the slot n+1) of the PUSCH occasion #0 in the PUSCH occasion group #1 are respectively in two adjacent slots (the slot n and the slot n+1), that is, the PUSCH occasion #0 in the PUSCH occasion group #1 is cross-slot. In this case, a time domain resource length of the PUSCH occasion #0 in the PUSCH occasion group #1 is shortened, so that all symbols of a shortened PUSCH occasion #0 in the PUSCH occasion group #1 are in a same slot. With reference to FIG. 13B, all the symbols of the shortened PUSCH occasion #0 in the PUSCH occasion group #1 are in the slot n, the PUSCH occasion #1 in the PUSCH occasion group #1 starts from the first symbol of the slot n+1, and a time domain resource length of the PUSCH occasion #1 in the PUSCH occasion group #1 remains unchanged. A time domain resource length of the shortened PUSCH occasion #0 in the PUSCH occasion group #1 in this embodiment is greater than the first time domain length threshold (X=2). In this case, the shortened PUSCH occasion #0 in the PUSCH occasion group #1 may be used as a first PUSCH occasion to send uplink data.

In this embodiment, a third PUSCH occasion with a cross-slot time domain resource that is not the last third PUSCH occasion in a group and that does not satisfy the preset condition may be processed in the foregoing shortening manner, so that the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Scenario 6: The configuration information of the time domain resource start position includes a start slot sequence number n, a start symbol S is equal to 2, L configured based on the configuration information of the time domain resource length of the PUSCH occasion is equal to 3, Q=3, the guard period $N_{GP}$ is equal to 1, K=2, X=2, and $N_{symb}^{slot}$ is 14. Step 401 and step 402 in the embodiment shown in FIG. 11 are described by using the scenario 6.

FIG. 14A is a schematic diagram of a time domain resource of another PUSCH occasion according to an embodiment of this application. The terminal device may determine, by using step 401, time domain resources of three (Q=3) PUSCH occasion groups shown in FIG. 14A: a PUSCH occasion group #0, a PUSCH occasion group #1, and a PUSCH occasion group #2, and determine third PUSCH occasions in each group: a PUSCH occasion #0 and a PUSCH occasion #1 in the PUSCH occasion group #0, a PUSCH occasion #0 and a PUSCH occasion #1 in the PUSCH occasion group #1, and a PUSCH occasion #0 and a PUSCH occasion #1 in the PUSCH occasion group #2. The start symbol S that is equal to 2, that is, the third available symbol in a start slot, is configured based on the configuration information of the time domain resource start position. As shown in FIG. 14A, a start position of the PUSCH occasion #0 in the PUSCH occasion group #0 is a symbol #2 of a slot #n, a start position of the PUSCH occasion #1 in the PUSCH occasion group #0 is a symbol #5 of the slot #n, a start position of the PUSCH occasion #0 in the PUSCH occasion group #1 is a symbol #9 of the slot #n, a start position of the PUSCH occasion #1 in the PUSCH occasion group #1 is a symbol #12 of the slot #n, a start position of the PUSCH occasion #0 in the PUSCH occasion group #2 is a symbol #2 of a slot #n+1, and a start position of the PUSCH occasion #1 in the PUSCH occasion group #2 is a symbol #5 of the slot #n+1.

The terminal device may use each of the PUSCH occasion #0 and the PUSCH occasion #1 in the PUSCH occasion group #0, the PUSCH occasion #0 in the PUSCH occasion group #1, and the PUSCH occasion #0 and the PUSCH occasion #1 in the PUSCH occasion group #2 as a time domain resource of one first PUSCH occasion in the time domain resources of the plurality of first PUSCH occasions by using step 402. The PUSCH occasion #1 that is in the PUSCH occasion group #1 and that does not satisfy the preset condition may be processed in the following manner: The terminal device may shorten a time domain length of the PUSCH occasion #1 in the PUSCH occasion group #1 to obtain a first PUSCH occasion satisfying the preset condition. Because the PUSCH occasion #1 in the PUSCH occasion group #1 in this embodiment is the last third PUSCH occasion in the PUSCH occasion group #1, a shortening manner thereof is different from that in the embodiment shown in FIG. 13B.

For details, refer to FIG. 14B. FIG. 14B is a schematic diagram of a time domain resource of another PUSCH occasion according to an embodiment of this application. FIG. 14B is a schematic diagram of a result of adjusting the third PUSCH occasion (the PUSCH occasion #1 in the PUSCH occasion group #1) that does not satisfy the preset condition in FIG. 14A. As shown in FIG. 14A, a first part of time domain symbols (the symbol #12 and a symbol #13 of the slot n) and a second part of time domain symbols (a symbol 0 of the slot n+1) of the PUSCH occasion #1 in the PUSCH occasion group #1 are respectively in two adjacent slots (the slot n and the slot n+1), that is, the PUSCH occasion #1 in the PUSCH occasion group #1 is cross-slot. In this case, a time domain resource length of the PUSCH occasion #1 in the PUSCH occasion group #1 is shortened, so that all symbols of a shortened PUSCH occasion #1 in the PUSCH occasion group #1 and a guard period after the shortened PUSCH occasion #1 are in a same slot. With reference to FIG. 14B, all the symbols of the shortened PUSCH occasion #1 in the PUSCH occasion group #1 and the guard period after the shortened PUSCH occasion #1 are in the slot n, the PUSCH occasion #0 in the PUSCH occasion group #2 starts from the first symbol of the slot n+1, and a time domain resource length of the PUSCH occasion #0 in the PUSCH occasion group #2 remains unchanged. However, because a time domain resource length of the shortened PUSCH occasion #1 in the PUSCH occasion group #1 in this embodiment is less than the first time domain length threshold (X=2), the shortened PUSCH occasion #1 in the PUSCH occasion group #1 is used as an invalid first PUSCH occasion, and is not used to send uplink data.

In this embodiment, a third PUSCH occasion with a cross-slot time domain resource that is the last third PUSCH occasion in a group and that does not satisfy the preset condition may be processed in the foregoing shortening manner, so that the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Based on any one of the foregoing embodiments, the first information in this application may not include a quantity F of frequency domain resources of frequency division multiplexed PUSCH occasions, and the quantity of frequency domain resources of frequency division multiplexed PUSCH occasions may be determined based on a quantity of random access preambles associated with the plurality of first PUSCH occasions.

For example, the quantity of frequency domain resources of frequency division multiplexed PUSCH occasions may be $$\left\lceil \frac{N_{preamble}}{N_a \cdot Q_1 \cdot N_{DMRS}} \right\rceil,$$

where $N_{preamble}$ is the quantity of random access preambles associated with the plurality of first PUSCH occasions, $N_a$ is a quantity of random access preambles associated with one PUSCH resource unit, $N_a$ may be predefined or may be configured by the network device, the PUSCH resource unit refers to a combination of one PUSCH occasion and one DMRS port, a combination of one PUSCH occasion and one DMRS sequence, a combination of one PUSCH occasion, one DMRS sequence, and one DMRS port, or a PUSCH occasion and a DMRS port and/or a DMRS sequence associated with the PUSCH occasion, $Q_1$ is a quantity of time domain resources of the plurality of first PUSCH occasions, $N_{DMRS}$ is a quantity of PUSCH resource units included in each PUSCH occasion, that is, a quantity of DMRS ports and/or a quantity of DMRS sequences on each PUSCH occasion, and ⌈ ⌉ is a ceiling operator.

For another example, the quantity of frequency domain resources of frequency division multiplexed PUSCH occasions may be $$\left\lceil \frac{N_{preamble}}{N_b \cdot Q_1} \right\rceil,$$

where $N_{preamble}$ is the quantity of random access preambles associated with the plurality of first PUSCH occasions, $N_b$ is a quantity of random access preambles associated with one PUSCH occasion, $N_b$ may be predefined or may be configured by the network device, and $Q_1$ is a quantity of time domain resources of the plurality of first PUSCH occasions.

As described above, the first information may include the guard period configuration information and the time domain resource configuration information of the PUSCH occasion. In another implementation, the time domain resource configuration information of the PUSCH occasion may include configuration information of a time domain resource start position and configuration information of a time domain resource length of the PUSCH occasion. The configuration information of the time domain resource start position is used to configure a start position of the time domain resources of the plurality of first PUSCH occasions. The configuration information of the time domain resource start position may include start slot configuration information and/or start symbol configuration information. For example, the start slot configuration information may be used to determine a start slot sequence number, the start symbol configuration information may be used to determine a start symbol sequence number(S), the start slot sequence number is used to determine the first slot of the plurality of first PUSCH occasions, and the start symbol sequence number (S) is used to determine a sequence number of the first symbol of the plurality of first PUSCH occasions in the start slot. The configuration information of the time domain resource start position may be a time offset with respect to a PRACH time domain resource, or may be a periodicity and a time offset with respect to an SFN equal to 0. This is not limited in the solutions in this embodiment of this application. The configuration information of the time domain resource length of the PUSCH occasion is used to configure the time domain resource length (L) of the PUSCH occasion. A specific value of L may be flexibly set based on a requirement. For example, L is set to 5, and L may be measured by a symbol quantity. Different from that in the foregoing implementation, in the another implementation, the time domain resource configuration information of the PUSCH occasion may not include the quantity Q of time division multiplexed PUSCH occasions, and a quantity of time domain resources of the plurality of first PUSCH occasions may be determined based on a quantity of random access preambles associated with the plurality of first PUSCH occasions. In some embodiments, some information in the configuration information of the time domain resource start position, the configuration information of the time domain resource length of the PUSCH occasion, and the quantity Q of time division multiplexed PUSCH occasions may be jointly coded. For example, the start symbol sequence number(S) in the configuration information of the time domain resource start position and the time domain resource length (L) of the PUSCH occasion may be jointly coded into one parameter. For example, one parameter may indicate the start symbol S and the time domain resource length L of the PUSCH occasion.

For example, the quantity of time domain resources of the plurality of first PUSCH occasions may be $$\left\lceil \frac{N_{preamble}}{N_a \cdot F \cdot N_{DMRS}} \right\rceil,$$

where $N_{preamble}$ is the quantity of random access preambles associated with the plurality of first PUSCH occasions, $N_a$ is a quantity of random access preambles associated with one PUSCH resource unit, $N_a$ may be predefined or may be configured by the network device, the PUSCH resource unit refers to a combination of one PUSCH occasion and one DMRS port, a combination of one PUSCH occasion and one DMRS sequence, or a combination of one PUSCH occasion, one DMRS sequence, and one DMRS port, F is a quantity of frequency domain resources of frequency division multiplexed PUSCH occasions that is configured by the network device, and $N_{DMRS}$ is a quantity of PUSCH resource units included in each PUSCH occasion, that is, a quantity of DMRS ports and/or a quantity of DMRS sequences on each PUSCH occasion.

For another example, the quantity of time domain resources of the plurality of first PUSCH occasions may be $$\left\lceil \frac{N_{preamble}}{N_b \cdot F} \right\rceil,$$

where $N_{preamble}$ is the quantity of random access preambles associated with the plurality of first PUSCH occasions, $N_b$ is a quantity of random access preambles associated with one PUSCH occasion, $N_b$ may be predefined or may be configured by the network device, and F is a quantity of frequency domain resources of frequency division multiplexed PUSCH occasions that is configured by the network device.

As described above, the first information may include the guard period configuration information and the time domain resource configuration information of the PUSCH occasion. In another implementation, the time domain resource configuration information of the PUSCH occasion may include configuration information of a time domain resource start position, configuration information of a time domain resource length of the PUSCH occasion, and a quantity P of slots for configuring PUSCH occasions. The quantity P of slots is used to represent a quantity of consecutive slots occupied by the plurality of first PUSCH occasions configured based on the first information. A specific value of P may be flexibly set based on a requirement. For example, P is set to 3. The configuration information of the time domain resource start position is used to configure a start position of the time domain resources of the plurality of first PUSCH occasions. The configuration information of the time domain resource start position may include start slot configuration information and/or start symbol configuration information. For example, the start slot configuration information may be used to determine a start slot sequence number, the start symbol configuration information may be used to determine a start symbol sequence number(S), the start slot sequence number is used to determine the first slot of the plurality of first PUSCH occasions, and the start symbol sequence number(S) is used to determine a sequence number that is of the first symbol of the plurality of first PUSCH occasions in each of the P slots and that is in the slot. The configuration information of the time domain resource start position may be a time offset with respect to a PRACH time domain resource, or may be a periodicity and a time offset with respect to an SFN equal to 0. This is not limited in the solutions in this embodiment of this application. The configuration information of the time domain resource length of the PUSCH occasion is used to configure the time domain resource length (L) of the PUSCH occasion. A specific value of L may be flexibly set based on a requirement. For example, L is set to 5, and L may be measured by a symbol quantity. In some embodiments, some information in the configuration information of the time domain resource start position, the configuration information of the time domain resource length of the PUSCH occasion, and the quantity P of slots for configuring PUSCH occasions may be jointly coded. For example, the start symbol sequence number(S) in the configuration information of the time domain resource start position and the time domain resource length (L) of the PUSCH occasion may be jointly coded into one parameter.

For example, a quantity of time domain resources of first PUSCH occasions in each of the P consecutive slots may be any positive integer greater than 0 and less than or equal to $$\left\lfloor \frac{N_{symb}^{slot} - S}{L + N_{GP}} \right\rfloor,$$

where $N_{symb}^{slot}$ is a quantity of symbols in each slot, L is the time domain length configured based on the configuration information of the time domain resource length of the PUSCH occasion, $N_{GP}$ is a length of a guard period configured based on the guard period configuration information, and S is the start symbol configured based on the configuration information of the time domain resource start position. A specific value of the quantity of time domain resources of first PUSCH occasions in each of the P consecutive slots may be preset, or may be configured by the network device. The terminal device may determine time domain resources of first PUSCH occasions in each of the P consecutive slots based on the configuration information of the time domain resource start position, the configuration information of the time domain resource length of the PUSCH occasion, and the guard period. $\lfloor\ \rfloor$ is a floor operator.

There is a guard period separating any two adjacent first PUSCH occasions in the time domain resources of the first PUSCH occasions in each of the P slots, and the time domain resources of the first PUSCH occasions in each slot and guard periods are continuously distributed in time domain.

In an implementation, a quantity of time domain resources of first PUSCH occasions in each of the P slots is 1, start positions of first PUSCH occasions in all slots are the same and are S, and time domain resource lengths are the same and are L.

In some embodiments, when the quantity of time domain resources of first PUSCH occasions in each of the P slots is 1, the first information may not include the guard period configuration information.

In another implementation, a quantity of time domain resources of first PUSCH occasions in each of the P slots is $$\left\lfloor \frac{N_{symb}^{slot} - S}{L + N_{GP}} \right\rfloor,$$

a time domain length of a time domain resource of each first PUSCH occasion is L, and a start position of a time domain resource of the i$^{th}$ $$\left( i = 0, 1, \ldots, \left\lfloor \frac{N_{symb}^{slot} - S}{L + N_{GP}} \right\rfloor - 1 \right)$$

first PUSCH occasion in each slot is $((L+N_{GP})*i+S)$.

FIG. 15 is a flowchart of another uplink transmission time domain resource determining method according to an embodiment of this application. This embodiment is another specific implementation of step 102 or step 202 in the foregoing embodiment. First information in this embodiment includes guard period configuration information and time domain resource configuration information of a PUSCH occasion. The time domain resource configuration information of the PUSCH occasion may include configuration information of a time domain resource start position, configuration information of a time domain resource length of the PUSCH occasion, and a quantity P of slots for configuring PUSCH occasions. In this embodiment, a quantity of time domain resources of fourth PUSCH occasions in each of P consecutive slots is $$\left\lfloor \frac{N_{symb}^{slot} - S}{L + N_{GP}} \right\rfloor.$$

As shown in FIG. 15, the method in this embodiment may include the following steps.

Step 501: Determine time domain resources of fourth PUSCH occasions in each of the P consecutive slots based on the configuration information of the time domain resource start position, the configuration information of the time domain resource length of the PUSCH occasion, and a guard period.

For example, a terminal device may determine time domain start positions of time-frequency resources of fourth PUSCH occasions in the P consecutive slots based on the configuration information of the time domain resource start position. For example, a time domain start position of a time-frequency resource of the first fourth PUSCH occasion may be determined based on the configuration information of the time domain resource start position. The time domain start position of the time-frequency resource of the first fourth PUSCH occasion may be a start slot n and a start symbol S in the slot. If only the start slot can be determined based on the configuration information of the time domain resource start position, a default start symbol may be used, for example, the first available symbol in the slot, that is, S=0. The terminal device determines the time domain resources of the fourth PUSCH occasions in each of the P consecutive slots based on the time domain start position with reference to the configuration information of the time domain resource length of the PUSCH occasion and the guard period, and quantities and time domain start positions of time domain resources of fourth PUSCH occasions in all of the P consecutive slots are the same.

There is a guard period separating any two adjacent fourth PUSCH occasions in time domain resources of fourth PUSCH occasions in each of the P slots, and the time domain resources of the fourth PUSCH occasions in each slot and guard periods are continuously distributed in time domain.

A quantity of time domain resources of fourth PUSCH occasions in each of the P slots is $$\left\lfloor \frac{N_{symb}^{slot} - S}{L + N_{GP}} \right\rfloor,$$

time domain lengths of time domain resources of first $$\left\lfloor \frac{N_{symb}^{slot} - S}{L + N_{GP}} \right\rfloor$$

fourth PUSCH occasions are all L, and each fourth PUSCH occasion is one of a plurality of first PUSCH occasions. If there is still a remaining symbol after time domain resources of $$\left\lfloor \frac{N_{symb}^{slot} - S}{L + N_{GP}} \right\rfloor$$

fourth PUSCH occasions in each of the P slots, a time domain length of a time domain resource of the last fourth PUSCH occasion in each of the P slots is $\mod(N_{symb}^{slot}-S, L+N_{GP})-N_{GP}$. A start position of a time domain resource of the i$^{th}$ $$\left( i = 0, 1, \ldots, \left\lfloor \frac{N_{symb}^{slot} - S}{L + N_{GP}} \right\rfloor - 1 \right)$$

fourth PUSCH occasion in each slot is ((L+$N_{GP}$)*i+S).

After the time domain resources of the fourth PUSCH occasions in each of the P consecutive slots is determined, a time domain resource of a first PUSCH occasion may be determined according to the following step.

Step 502: Use a time domain resource of any fourth PUSCH occasion satisfying a preset condition in each slot as a time domain resource of one of the plurality of first PUSCH occasions.

The preset condition may include: A quantity of all time domain symbols of the fourth PUSCH occasion is greater than or equal to a first time domain length threshold.

There is a fourth PUSCH occasion that does not satisfy the preset condition in the time domain resources of the fourth PUSCH occasions in each of the P consecutive slots that are determined in step 501. For example, if the time domain length of the time domain resource of the last fourth PUSCH occasion in each of the P slots is less than the first time domain length threshold, the time domain resource of the last fourth PUSCH occasion is not used as a time domain resource of a first PUSCH occasion. If the time domain length of the time domain resource of the last fourth PUSCH occasion is greater than or equal to the first time domain length threshold, the last fourth PUSCH occasion may be used as one of the plurality of first PUSCH occasions. Time domain resources of first $$\left\lfloor \frac{N_{symb}^{slot} - S}{L + N_{GP}} \right\rfloor$$

fourth PUSCH occasions in each slot can all satisfy the preset condition in this embodiment, and any fourth PUSCH occasion satisfying the preset condition may be used as a first PUSCH occasion.

In this embodiment, a network device sends first information to the terminal device, and the terminal device determines the time domain resources of the first PUSCH occasions in each of the P consecutive slots based on the configuration information of the time domain resource start position, the configuration information of the time domain resource length of the PUSCH occasion, and the guard period. In addition, the terminal device does not send uplink data in a guard period between at least two adjacent first PUSCH occasions. This can avoid interference between adjacent first PUSCH occasions that is caused due to asynchronization between the terminal device and the network device.

The embodiment shown in FIG. 15 is described below by using examples in scenarios of different values of a start slot sequence number and a start symbol sequence number included in the configuration information of the time domain resource start position, L configured based on the configuration information of the time domain resource length of the PUSCH occasion, the quantity P of slots for configuring PUSCH occasions, the guard period $N_{GP}$, and the first time domain length threshold X.

Scenario 7: The configuration information of the time domain resource start position includes a start slot sequence number n, a start symbol S is equal to 0, L configured based on the configuration information of the time domain resource length of the PUSCH occasion is equal to 5, P=2, the guard period $N_{GP}$ is equal to 1, X=3, and $N_{symb}^{slot}$ is 14. Step 501 and step 502 in the embodiment shown in FIG. 15 are described by using the scenario 7.

FIG. 16 is a schematic diagram of a time domain resource of another PUSCH occasion according to an embodiment of this application. The terminal device may determine, by using step 501 and step 502, fourth PUSCH occasions in each of two (P=2) consecutive slots shown in FIG. 16: a PUSCH occasion #0 and a PUSCH occasion #1 in a slot n, and a PUSCH occasion #2 and a PUSCH occasion #3 in a slot n+1. It may be determined by using step 501 that there may be three PUSCH occasions in each slot, and it may be determined by using step 502 that the last PUSCH occasion in each slot does not satisfy the preset condition. Therefore, it may be determined that there are two PUSCH occasions in each slot. As shown in FIG. 16, a start position of the PUSCH occasion #0 is a symbol #0 of the slot #n, a start position of the PUSCH occasion #1 is a symbol #6 of the slot #n, a start position of the PUSCH occasion #2 is a symbol #0 of the slot #n+1, and a start position of the PUSCH occasion #3 is a symbol #6 of the slot #n+1.

The terminal device uses each of all fourth PUSCH occasions, that is, the PUSCH occasion #0, the PUSCH occasion #1, the PUSCH occasion #2, and the PUSCH occasion #3, as a time domain resource of one first PUSCH occasion in the time domain resources of the plurality of first PUSCH occasions.

In this embodiment, the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

Scenario 8: The configuration information of the time domain resource start position includes a start slot sequence number n, L configured based on the configuration information of the time domain resource length of the PUSCH occasion is equal to 4, P=2, the guard period $N_{GP}$ is equal to 1, X=2, and $N_{symb}^{slot}$ is 14. Step 501 and step 502 in the embodiment shown in FIG. 15 are described by using the scenario 8. In the scenario 8, a fourth PUSCH occasion is determined in another implementation in step 501.

FIG. 17 is a schematic diagram of a time domain resource of another PUSCH occasion according to an embodiment of this application. The terminal device may determine, by using step 501, fourth PUSCH occasions in each of two (P=2) consecutive slots shown in FIG. 17: a PUSCH occasion #0, a PUSCH occasion #1, and a PUSCH occasion #2 in a slot n, and a PUSCH occasion #0, a PUSCH occasion #1, and a PUSCH occasion #2 in a slot n+1. Time domain resource lengths of the PUSCH occasion #0 and the PUSCH occasion #1 in the slot n are 4, time domain resource lengths of the PUSCH occasion #0 and the PUSCH occasion #1 in the slot n+1 are 4, and time domain resource lengths of the PUSCH occasion #2 in the slot n and the PUSCH occasion #2 in the slot n+1 are 3. Because only the start slot sequence number n is configured based on the configuration information of the time domain resource start position, a default start symbol may be used. For example, in this embodiment, the default start symbol is 0, that is, the first available symbol in a start slot. As shown in FIG. 17, a start position of the PUSCH occasion #0 in the slot n is a symbol #0 of the slot #n, a start position of the PUSCH occasion #1 in the slot n is a symbol #5 of the slot #n, a start position of the PUSCH occasion #2 in the slot n is a symbol #10 of the slot #n, a start position of the PUSCH occasion #0 in the slot n+1 is a symbol #0 of the slot #n+1, a start position of the PUSCH occasion #1 in the slot n+1 is a symbol #5 of the slot #n+1, and a start position of the PUSCH occasion #2 in the slot n+1 is a symbol #10 of the slot #n+1.

The terminal device uses each of first two fourth PUSCH occasions, that is, the PUSCH occasion #0 and the PUSCH occasion #1, in the slot n and first two fourth PUSCH occasions, that is, the PUSCH occasion #0 and the PUSCH occasion #1, in the slot n+1 as a time domain resource of one first PUSCH occasion in the time domain resources of the plurality of first PUSCH occasions. Because time domain lengths of the last fourth PUSCH occasions in the slot n and the slot n+1 each are three symbols, and are greater than X (X=2), the last fourth PUSCH occasions, that is, the PUSCH occasions #2, in the slot n and the slot n+1 each are used as the time domain resource of one first PUSCH occasion in the time domain resources of the plurality of first PUSCH occasions.

In this embodiment, the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

As described above, the first information may include the guard period configuration information and the time domain resource configuration information of the PUSCH occasion. In another implementation, the time domain resource configuration information of the PUSCH occasion may include configuration information of a time domain resource start position and configuration information of a time domain resource length of the PUSCH occasion. In an embodiment, the time domain resource configuration information of the PUSCH occasion may not include the quantity P of slots for configuring PUSCH occasions, and the quantity of slots for configuring PUSCH occasions may be determined based on a quantity of random access preambles associated with the plurality of first PUSCH occasions. The configuration information of the time domain resource start position is used to configure a start position of the time domain resources of the plurality of first PUSCH occasions. The configuration information of the time domain resource start position may include start slot configuration information and/or start symbol configuration information. For example, the start slot configuration information may be used to determine a start slot sequence number, the start symbol configuration information may be used to determine a start symbol sequence number(S), the start slot sequence number is used to determine the first slot of the plurality of first PUSCH occasions, that is, a start slot for configuring a time domain resource of a PUSCH occasion, and the start symbol sequence number(S) is used to determine a sequence number of a start symbol of the first PUSCH occasion in each slot in which the plurality of first PUSCH occasions are located. The configuration information of the time domain resource start position may be a time offset with respect to a PRACH time domain resource, or may be a periodicity and a time offset with respect to an SFN equal to 0. This is not limited in the solutions in this embodiment of this application. The configuration information of the time domain resource length of the PUSCH occasion is used to configure the time domain resource length (L) of the PUSCH occasion. A specific value of L may be flexibly set based on a requirement. For example, L is set to 5, and L may be measured by a symbol quantity. In some embodiments, some information in the configuration information of the time domain resource start position and the configuration information of the time domain resource length of the PUSCH occasion may be jointly coded. For example, the start symbol sequence number in the configuration information of the time domain resource start position and the time domain resource length of the PUSCH occasion may be jointly coded into one parameter.

For example, the quantity of slots of the PUSCH occasions may be $$\left\lceil \frac{N_{preamble}}{N_a \cdot F \cdot N_p \cdot N_{DMRS}} \right\rceil,$$

where $N_{preamble}$ is the quantity of random access preambles associated with the plurality of first PUSCH occasions, $N_a$ is a quantity of random access preambles associated with one PUSCH resource unit, $N_a$ may be predefined or may be configured by the network device, the PUSCH resource unit refers to a PUSCH occasion and a DMRS port and/or a DMRS sequence on the PUSCH occasion, F is a quantity of frequency domain resources of frequency division multiplexed PUSCH occasions that is configured by the network device, $N_p$ is a quantity of time domain resources of first PUSCH occasions in each slot that are determined in any one of the foregoing implementations, and $N_{DMRS}$ is a quantity of PUSCH resource units included in each PUSCH occasion, that is, a quantity of DMRS ports and/or a quantity of DMRS sequences on each PUSCH occasion.

For another example, the quantity of time domain resources of the plurality of first PUSCH occasions may be $$\left\lceil \frac{N_{preamble}}{N_b \cdot F \cdot N_p} \right\rceil,$$

where $N_{preamble}$ is the quantity of random access preambles associated with the plurality of first PUSCH occasions, $N_b$ is a quantity of random access preambles associated with a time-frequency resource of one PUSCH occasion, $N_b$ may be predefined or may be configured by the network device, F is a quantity of frequency domain resources of frequency division multiplexed PUSCH occasions that is configured by the network device, and $N_p$ is a quantity of time domain resources of first PUSCH occasions in each slot that are determined in any one of the foregoing implementations.

As described above, the first information may include the guard period configuration information and the time domain resource configuration information of the PUSCH occasion. In another implementation, the time domain resource configuration information of the PUSCH occasion may include configuration information of a time domain resource start position, configuration information of a time domain resource length of the PUSCH occasion, and slot configuration information of the PUSCH occasion. The slot configuration information of the PUSCH occasion is used to configure a slot occupied by the plurality of first PUSCH occasions. For example, the slot configuration information of the PUSCH occasion may be a bitmap, and each bit of the bitmap is used to determine whether a slot is a slot of a PUSCH occasion. "1" indicates that the slot is a slot of a PUSCH occasion, and "0" indicates that the slot is not a slot of a PUSCH occasion. The configuration information of the time domain resource start position is used to configure a start position of the time domain resources of the plurality of first PUSCH occasions. The configuration information of the time domain resource start position may include start slot configuration information and/or start symbol configuration information. For example, the start slot configuration information may be used to determine a start slot sequence number, the start symbol configuration information may be used to determine a start symbol sequence number(S), the start slot sequence number is used to determine a slot position determined by the first bit of the bitmap, and the start symbol sequence number(S) is used to determine a sequence number that is of the first symbol of the plurality of first PUSCH occasions in each of slots of the plurality of PUSCH occasions and that is in the slot. The configuration information of the time domain resource start position may be a time offset with respect to a PRACH time domain resource, or may be a periodicity and a time offset with respect to an SFN equal to 0. This is not limited in the solutions in this embodiment of this application. The configuration information of the time domain resource length of the PUSCH occasion is used to configure the time domain resource length (L) of the PUSCH occasion. A specific value of L may be flexibly set based on a requirement. For example, L is set to 5, and L may be measured by a symbol quantity. In some embodiments, some information in the configuration information of the time domain resource start position and the configuration information of the time domain resource length of the PUSCH occasion may be jointly coded. For example, the start symbol sequence number(S) in the configuration information of the time domain resource start position and the time domain resource length (L) of the PUSCH occasion may be jointly coded into one parameter.

For example, the slot configuration information of the PUSCH occasion may be "110010". In this case, a slot determined based on the start slot configuration information and the first and fourth slots after the slot are all slots of PUSCH occasions. A quantity of time domain resources of first PUSCH occasions in each slot of PUSCH occasions may be any positive integer greater than 0 and less than or equal to $$\left\lfloor \frac{N_{symb}^{slot} - S}{L + N_{GP}} \right\rfloor,$$

where $N_{symb}^{slot}$ is a quantity of symbols in each slot, L is the time domain length configured based on the configuration information of the time domain resource length of the PUSCH occasion, $N_{GP}$ is a length of a guard period configured based on the guard period configuration information, and S is the start symbol configured based on the configuration information of the time domain resource start position. A specific value of the quantity of time domain resources of first PUSCH occasions in each of the slots of the plurality of PUSCH occasions may be preset, or may be configured by the network device. The terminal device may determine time domain resources of first PUSCH occasions in each of the slots of the plurality of PUSCH occasions based on the configuration information of the time domain resource start position, the configuration information of the time domain resource length of the PUSCH occasion, and the guard period.

There is a guard period separating any two adjacent first PUSCH occasions in the time domain resources of the first PUSCH occasions in each of the slots of the plurality of PUSCH occasions, and the time domain resources of the first PUSCH occasions in each slot and guard periods are continuously distributed in time domain.

FIG. 18 is a schematic diagram of a time domain resource of another PUSCH occasion according to an embodiment of this application. The terminal device determines slots of PUSCH occasions: a slot #n, a slot #n+1, and a slot #n+4, based on the start slot configuration information (slot n) and the slot configuration information ("110010") of the PUSCH occasion. A quantity of time domain resources of first PUSCH occasions in each slot of a PUSCH occasion is 1. The terminal device determines a time domain resource of a first PUSCH occasion in each slot of a PUSCH occasion based on the start symbol configuration information and the configuration information of the time domain resource length of the PUSCH occasion, for example, a PUSCH occasion #0, a PUSCH occasion #1, and a PUSCH occasion #2, as shown in FIG. 18.

Based on any one of the foregoing embodiments in FIG. 15 to FIG. 18, the time domain resource configuration information in the first information in this application may further include repetition indication information, and the repetition indication information is used to indicate whether there are a plurality of consecutive fifth PUSCH occasions in a PUSCH occasion group. For example, if the repetition indication information indicates that there are a plurality of consecutive fifth PUSCH occasions in a PUSCH occasion group, the terminal device may determine, by using a default value, a quantity of PUSCH occasion groups in each of the P consecutive slots. For example, the default value is 1, that is, there is only one PUSCH occasion group in each of the P consecutive slots, and there is no time interval between time domain resources of fifth PUSCH occasions in each PUSCH occasion group.

A quantity R of repetition times of fifth PUSCH occasions in each PUSCH occasion group may be calculated in the following manners:

Manner 1:

$$R = \left\lfloor \frac{N_{symb}^{slot} - S - N_{GP}}{L} \right\rfloor,$$

a start position of a fifth PUSCH occasion #i in a PUSCH occasion group in each slot is S+L*i, and a time domain resource length of each fifth PUSCH occasion is L.

Manner 2:

$$R = \left\lceil \frac{N_{symb}^{sloc} - S - N_{GP}}{L} \right\rceil,$$

a start position of a fifth PUSCH occasion #i in a PUSCH occasion group in each slot is S+L*i, time domain resource lengths of first $$\left\lfloor \frac{N_{symb}^{slot} - S - N_{GP}}{L} \right\rfloor$$

fifth PUSCH occasions are L, a time domain resource length of the last fifth PUSCH occasion is mod ($N_{symb}^{slot}$-S-$N_{GP}$, L), and if mod ($N_{symb}^{slot}$-S-$N_{GP}$, L)=0, there are only $$\left\lfloor \frac{N_{symb}^{slot} - S - N_{GP}}{L} \right\rfloor$$

fifth PUSCH occasions whose lengths are L.

In some embodiments, the time domain resource configuration information in the first information in this application may further include a quantity R of repetition times of fifth PUSCH occasions in each PUSCH occasion group. In this case, the terminal device may determine, by using a default value, a quantity of PUSCH occasion groups in each of the P consecutive slots. For example, the default value is 1, that is, there is only one PUSCH occasion group in each of the P consecutive slots. The PUSCH occasion group includes R consecutive fifth PUSCH occasions, there is no time interval between time domain resources of two adjacent fifth PUSCH occasions, and there is a guard period after the last fifth PUSCH occasion in each PUSCH occasion group. A start position of a fifth PUSCH occasion #i in a PUSCH occasion group in each slot is S+L*i.

In this embodiment, the plurality of first PUSCH occasions determined based on the first information each are in a same slot. This can prevent a first PUSCH occasion from being cross-slot. In addition, the terminal device does not send uplink data in a guard period between at least two adjacent first PUSCH occasion groups. This can avoid interference between adjacent first PUSCH occasions that is caused due to asynchronization between the terminal device and the network device.

Based on any one of the foregoing embodiments in FIG. 15 to FIG. 18, the time domain resource configuration information in the first information in this application may further include a quantity W of time division multiplexed PUSCH occasions in each slot.

In this embodiment, the terminal device may determine a start position of a time domain resource of a fourth PUSCH occasion in each of the P consecutive slots based on the configuration information of the time domain resource start position that is included in the first information. For example, a time domain start position of a time-frequency resource of the first fourth PUSCH occasion may be determined based on the configuration information of the time domain resource start position. The time domain start position of the time-frequency resource of the first fourth PUSCH occasion may be a start slot n and a start symbol S in the slot. If only the start slot can be determined based on the configuration information of the time domain resource start position, a default start symbol may be used, for example, the first available symbol in the slot, that is, S=0. The terminal device determines time domain resources of fourth PUSCH occasions in each of the P consecutive slots based on the time domain start position with reference to the configuration information of the time domain resource length of the PUSCH occasion, the quantity W of time division multiplexed PUSCH occasions in each slot, and the guard period, and quantities (W) and time domain start positions of time domain resources of fourth PUSCH occasions in all of the P consecutive slots are the same.

A start position of a time domain resource of the $i^{th}$ (i=0,1, . . . , W−1) fourth PUSCH occasion in each slot is $((L+N_{GP})*i+S)$.

A time domain resource of any fourth PUSCH occasion satisfying the preset condition in each slot is used as a time domain resource of one of the plurality of first PUSCH occasions. The preset condition includes: A quantity of all time domain symbols of the fourth PUSCH occasion is greater than or equal to the first time domain length threshold.

In this embodiment, the plurality of first PUSCH occasions determined based on the first information each are in a same slot. This can prevent a first PUSCH occasion from being cross-slot. In addition, the terminal device does not send uplink data in a guard period between at least two adjacent first PUSCH occasions. This can avoid interference between adjacent first PUSCH occasions that is caused due to asynchronization between the terminal device and the network device.

In another embodiment, the time domain configuration information of the PUSCH occasion in the first information may include slot configuration information, start symbol configuration information, and time domain resource length configuration information of the PUSCH occasion. The slot configuration information of the PUSCH occasion is used to configure a slot offset of the PUSCH occasion relative to each PRACH time domain resource, the start symbol configuration information is used to configure a start symbol of the PUSCH occasion in a slot configured based on the slot configuration information, and the time domain resource length configuration information is used to configure a quantity of symbols occupied by the PUSCH occasion. The start symbol configuration information and the time domain resource length configuration information may be jointly coded, that is, configured by using one parameter. The PRACH time domain resource may be a PRACH slot or a slot configured with a PRACH occasion. Frequency domain configuration information in the first information may include a frequency domain start position of the PUSCH occasion and bandwidth configuration information of the PUSCH occasion, and the bandwidth configuration information of the PUSCH occasion is used to configure a quantity of physical resource blocks (physical resource block, PRB) occupied by the PUSCH occasion. In this embodiment, only one PUSCH occasion is configured for each PRACH time domain resource.

In this embodiment, the first information does not include a quantity of PUSCH occasions in time domain that correspond to each PRACH time domain resource or a quantity of PUSCH occasions in frequency domain. Specifically, the first information does not include a quantity of PUSCH slots corresponding to each PRACH time domain resource or a quantity of PUSCH occasions in time domain in each slot, and does not include a quantity of frequency division multiplexed PUSCH occasions. To be specific, each PRACH time domain resource is corresponding to only one PUSCH occasion. Regardless of which random access preamble and which PRACH occasion in the PRACH time domain resource are used by UE, the UE uses the PUSCH occasion. For contention-free two-step random access, because a PUSCH occasion is configured for one UE, that is, the PUSCH occasion is dedicated to the UE, only one PUSCH occasion is configured for each PRACH time domain resource. This can reduce signaling overheads and resource reservation overheads.

Because each PRACH time domain resource is corresponding to only one PUSCH occasion, the first information may not include time domain guard period configuration information or frequency domain guard bandwidth configuration information.

This embodiment may also be understood as follows: When the first information does not include configuration information of the quantity of PUSCH occasions in time domain that correspond to each PRACH time domain resource or the quantity of PUSCH occasions in frequency domain, it is considered by default that both the quantity of PUSCH occasions in time domain that correspond to each PRACH time domain resource and the quantity of PUSCH occasions in frequency domain are 1. When the first information does not include the time domain guard period configuration information or the frequency domain guard bandwidth configuration information, it is considered by default that a time domain guard period and frequency domain guard bandwidth are 0.

tion, MCS configuration information, frequency hopping configuration information, and power control configuration information that are of the PUSCH occasion, corresponding configuration information in PUSCH resource configuration of contention-based two-step random access may be reused as lacking configuration information.

In a specific example, this application provides an RRC information element (information element, IE): MsgA-PUSCH-Config-r16, of a PUSCH configuration used for contention-based two-step random access, as shown below:

```
MsgA-PUSCH-Config-r16 ::=                    SEQUENCE {
msgA-PUSCH-ResourceList-r16                  SEQUENCE (SIZE(1..2)) OF MsgA-
PUSCH-Resource-r16
msgA-TransmformPrecoder-r16                       ENUMERATED {enabled,
disabled}
msgA-DataScramblingIndex-r16                      INTEGER (0..1023)
msgA-DeltaPreamble-r16                            INTEGER (-1..6)
}
MsgA-PUSCH-Resource-r16 ::=                  SEQUENCE {
msgA-PUSCH-PreambleGroup-r16                      ENUMERATED {groupA,
groupB}
msgA-MCS-r16                                      INTEGER (0..15),
nrofSlotsMsgA-PUSCH-r16                           INTEGER (1..4),
nrofMsgA-PO-PerSlot-r16                      ENUMERATED {one, two, three,
six},
msgA-PUSCH-TimeDomainOffset-r16                   INTEGER (1..32),
msgA-PUSCH-TimeDomainAllocation-r16               INTEGER (1..maxNrofUL-
Allocations)
startSymbolAndLengthMsgA-PO-r16              INTEGER (0..127)
mappingTypeMsgA-PUSCH-r16                         ENUMERATED {typeA, typeB}
guardPeriodMsgA-PUSCH-r16                         INTEGER (0..3)
guardBandMsgA-PUSCH-r16                           INTEGER (0..1),
frequencyStartMsgA-PUSCH-r16                      INTEGER
(0..maxNrofPhysicalResourceBlocks-1),
nrofPRBs-PerMsgA-PO-r16                           INTEGER (1..32),
nrofMsgA-PO-FDM-r16                          ENUMERATED {one, two, four,
eight},
msgA-IntraSlotFrequencyHopping-r16           ENUMERATED {enabled}
msgA-HoppingBits-r16                              BIT STRING (SIZE(2))
msgA-DMRS-Config-r16                              MsgA-DMRS-Config-r16,
nrofDMRS-Sequences-r16                            INTEGER (1..2),
msgA-Alpha-r16                               ENUMERATED {alpha0, alpha04,
alpha05, alpha06,
alpha07, alpha08, alpha09, alpha1}
...
}
MsgA-DMRS-Config-r16 ::=                     SEQUENCE {
msgA-DMRS-AdditionalPosition-r16             ENUMERATED {pos0, pos1, pos3}
msgA-MaxLength-r16                                ENUMERATED {len2}
msgA-PUSCH-DMRS-CDM-Group-r16                     INTEGER (0..1)
msgA-PUSCH-NrofPorts-r16                          INTEGER (0..1)
msgA-ScramblingID0-r16                            INTEGER (0..65536)
msgA-ScramblingID1-r16                            INTEGER (0..65536)
}
```

The first information may not include configuration information of a quantity of DMRS ports or a quantity of DMRS sequences either, that is, it is considered by default that each PUSCH occasion is associated with only one DMRS port and one DMRS sequence. For example, it is considered by default that a DMRS port 0 is used for contention-free two-step random access.

Optionally, the first information may further include one or more of PUSCH MCS configuration information, frequency hopping configuration information, and power control configuration information.

Optionally, for PUSCH resource configuration in contention-free two-step random access, when the first information does not include one or more of slot configuration information, start symbol configuration information, time domain resource length configuration information, frequency domain start position and bandwidth configuration informa- For definitions of the foregoing parameters, refer to related descriptions in the standard 3GPP TS 38.331 V16.0.0 (2020-03).

This application provides an RRC IE of a PUSCH configuration used for contention-free two-step random access. A format of the RRC IE may follow a format of the RRC IE of the PUSCH configuration used for contention-based two-step random access, but the RRC IE does not include one or more of the foregoing black and bold parameters, such as nrofSlotsMsgA-PUSCH-r16, nrofMsgA-PO-PerSlot-r16, nrofMsgA-PO-FDM-r16, guardPeriodMsgA-PUSCH-r16, guardBandMsgA-PUSCH-r16, msgA-PUSCH-NrofPorts-r16, msgA-ScramblingID1-r16, and msgA-PUSCH-PreambleGroup-r16. In the foregoing RRC IE, the slot configuration information of the PUSCH occasion is determined based on msgA-PUSCH-TimeDomain-Offset-r16, and a start symbol of the PUSCH occasion in a slot and a quantity of symbols occupied by the PUSCH occasion are determined based on msgA-PUSCH-TimeDomainAllocation-r16, or a start symbol of the PUSCH occasion in a slot and a quantity of symbols occupied by the PUSCH occasion are determined based on startSymbolAndLengthMsgA-PO-r16.

In another embodiment, a format of the RRC IE of the PUSCH configuration used for contention-free two-step random access may be identical to a format of the RRC IE of the PUSCH configuration used for contention-based two-step random access, and the UE uses only a plurality of PUSCH occasions configured based on these parameters, the first (or predetermined) PUSCH occasion in a DMRS resource, and the first (or predetermined) DMRS resource as PUSCH resources of contention-free two-step random access. For example, when MsgA-PUSCH-Config-r16 is included in the RRC IE (for example, CFRA-TwoStep-r16) of the configuration used for contention-free two-step random access, the UE considers by default that a plurality of PUSCH occasions configured based on MsgA-PUSCH-Config-r16, the first (or predetermined) PUSCH occasion in a DMRS resource, and the first (or predetermined) DMRS resource are used as PUSCH resources of contention-free two-step random access:

```
CFRA-TwoStep-r16 ::=        SEQUENCE {
    .....
    msgA-CFRA-PUSCH-r16     MsgA-PUSCH-Config-r16,
    .....
}
```

In another embodiment, a format of the RRC IE of the PUSCH configuration used for contention-free two-step random access may be identical to a format of the RRC IE of the PUSCH configuration used for contention-based two-step random access. However, the parameter msgA-PUSCH-NrofPorts-r16 means that if a value of the field is 0, the first DMRS port in a CDM group is indicated; or if a value of the field is 1, the second port in a CDM group is indicated. Further, when there is no msgA-PUSCH-NrofPorts-r16 in the RRC IE of the PUSCH configuration used for contention-free two-step random access, the third port in the CDM group is indicated.

In another embodiment, if the RRC IE of the PUSCH configuration used for contention-free two-step random access does not include configuration information of one or more of the following parameters, it may be considered that the configuration information of these parameters is the same as corresponding configuration information in PUSCH configuration of contention-based two-step random access: msgA-TransmformPrecoder-r16, msgA-DataScramblingIndex-r16, msgA-DeltaPreamble-r16, msgA-MCS-r16, msgA-PUSCH-TimeDomainOffset-r16, msgA-PUSCH-TimeDomainAllocation-r16, mappingTypeMsgA-PUSCH-r16, frequency StartMsgA-PUSCH-r16, nrofPRBs-PerMsgA-PO-r16, msgA-IntraSlotFrequencyHopping-r16, msgA-HoppingBits-r16, msgA-Alpha-r16, msgA-DMRS-AdditionalPosition-r16, msgA-MaxLength-r16, and msgA-ScramblingID0-r16.

In still another embodiment, this application provides still another RRC IE (MsgA-CFRA-PUSCH-Config-r16) of a PUSCH configuration used for contention-free two-step random access, as shown below:

```
CFRA-TwoStep-r16 ::=                              SEQUENCE {
    ...
    msgA-CFRA-PUSCH-r16                           MsgA-CFRA-PUSCH-Config-r16,
    ...
}
MsgA-CFRA-PUSCH-Config-r16 ::=                    SEQUENCE {
    msgA-CFRA-PUSCH-Resource-r16                  MsgA-CFRA-PUSCH-Resource-r16
    msgA-TransmformPrecoder-r16                   ENUMERATED {enabled, disabled}
    msgA-DataScramblingIndex-r16                  INTEGER (0..1023)
    msgA-DeltaPreamble-r16                        INTEGER (-1..6)
}
    MsgA-CFRA-PUSCH-Resource-r16 ::=              SEQUENCE {
    msgA-MCS-r16                                  INTEGER (0..15),
    msgA-PUSCH-TimeDomainOffset-r16               INTEGER (1..32),
    msgA-PUSCH-TimeDomainAllocation-r16           INTEGER (1..maxNrofUL-Allocations)
    startSymbolAndLengthMsgA-PO-r16               INTEGER (0..127)
    mappingTypeMsgA-PUSCH-r16                     ENUMERATED {typeA, typeB}
    frequency StartMsgA-PUSCH-r16                 INTEGER (0..maxNrofPhysicalResourceBlocks-1),
    nrofPRBs-PerMsgA-PO-r16                       INTEGER (1..32),
    msgA-IntraSlotFrequencyHopping-r16            ENUMERATED {enabled}
    msgA-HoppingBits-r16                          BIT STRING (SIZE(2))
    msgA-Alpha-r16                                ENUMERATED {alpha0, alpha04, alpha05, alpha06, alpha07, alpha08, alpha09, alpha1}
    msgA-DMRS-AdditionalPosition-r16              ENUMERATED {pos0, pos1, pos3}
    msgA-MaxLength-r16                            ENUMERATED {len2}
    msgA-PUSCH-DMRS-port-r16                      INTEGER (0..7)
    msgA-ScramblingID0-r16                        INTEGER (0..65536)
    ...
}
```

Herein, msgA-PUSCH-DMRS-port-r16 is used to indicate a DMRS port number used for contention-free two-step random access. For other parameters, refer to related descriptions in 3GPP TS 38.331 V16.0.0 (2020-03). In this embodiment, if the foregoing RRC IE does not include the parameter msgA-PUSCH-DMRS-port-r16, a DMRS port 0 is used by default.

In an embodiment, if RRC IE MsgA-CFRA-PUSCH-Config-r16 does not include one or more of the following parameters, it may be considered that configuration information of these parameters is the same as corresponding configuration information in PUSCH configuration of contention-based two-step random access: msgA-Transmform-Precoder-r16, msgA-DataScramblingIndex-r16, msgA-DeltaPreamble-r16, msgA-MCS-r16, msgA-PUSCH-TimeDomainOffset-r16, msgA-PUSCH-TimeDomainAllocation-r16, startSymbolAndLengthMsgA-PO-r16, mappingTypeMsgA-PUSCH-r16, frequencyStartMsgA-PUSCH-r16, nrofPRBs-PerMsgA-PO-r16, msgA-IntraSlotFrequencyHopping-r16, msgA-HoppingBits-r16, msgA-Alpha-r16, msgA-DMRS-AdditionalPosition-r16, msgA-MaxLength-r16, and msgA-ScramblingID0-r16.

The PUSCH configuration used for contention-free two-step random access is not limited to the foregoing RRC IE implementation, and another implementation may alternatively be used. This is not limited in this application.

Based on any one of the foregoing embodiments, in an implementation, if the time domain resources of the plurality of first PUSCH occasions include an unavailable time domain symbol, a time domain resource of a first PUSCH occasion that includes the unavailable time domain symbol is a time domain resource of an invalid first PUSCH occasion.

The unavailable symbol may include a downlink symbol; or another symbol other than an uplink symbol; or a downlink symbol, a symbol in a time period T1 before the downlink symbol, and a symbol in a time period T2 after the downlink symbol; or another symbol other than an uplink symbol, a symbol in a time period T1 before the another symbol other than the uplink symbol, and a symbol in a time period T2 after the another symbol other than the uplink symbol; and/or a symbol on which a synchronization signal block is located; and/or a symbol in a time period T2 after the last symbol of the synchronization signal block. T1 and T2 are predefined or configured by the network device. T1 and T2 may be measured by symbols, or may be in a unit of ms. T1 and T2 may be the same or different. When T1 and T2 are the same, only one of T1 and T2 needs to be defined.

FIG. 19A and FIG. 19B each are a schematic diagram of unavailable symbols according to an embodiment of this application. As shown in FIG. 19A, the unavailable symbols include downlink symbols (D), symbols in a time period T1 before the downlink symbols (D), and symbols in a time period T2 after the downlink symbols (D). As shown in FIG. 19B, the unavailable symbols include downlink symbols (D) and a flexible symbol (F), symbols in a time period T1 before the downlink symbols (D) and the flexible symbol (F), and symbols in a time period T2 after the downlink symbols (D) and the flexible symbol (F).

A type of a symbol of a time domain resource is determined by using broadcast information, and/or an RRC message, and/or slot format indication information in dynamic message control information (DCI).

For the first PUSCH occasions determined in any one of the foregoing embodiments, if the time domain resources of the plurality of first PUSCH occasions include an unavailable time domain symbol, a time domain resource of a first PUSCH occasion that includes the unavailable time domain symbol is a time domain resource of an invalid first PUSCH occasion. To be specific, all first PUSCH occasions that completely overlap or partially overlap unavailable symbols are considered as invalid PUSCH occasions. Completely overlapping means that all symbols of a first PUSCH occasion overlap unavailable symbols, and partially overlapping means that some symbols of a first PUSCH occasion overlap unavailable symbols.

In this embodiment, the time domain resource of the first PUSCH occasion that includes the unavailable time domain symbol is used as a time domain resource of an invalid first PUSCH occasion, so that the terminal device can be prevented from sending uplink data on the unavailable symbol.

Based on any one of the foregoing embodiments, in another implementation, if Z consecutive available time domain symbols exist in the first PUSCH occasion that includes the unavailable time domain symbol, the Z consecutive available time domain symbols are determined as a time domain resource of a valid first PUSCH occasion, where Z is greater than or equal to the first time domain length threshold; or first $Z-N_{GP}$ consecutive available time domain symbols in the Z consecutive available time domain symbols are determined as a time domain resource of a valid first PUSCH occasion, where $Z-N_{GP}$ is greater than or equal to the first time domain length threshold.

Figures 20A, 20B, 21:
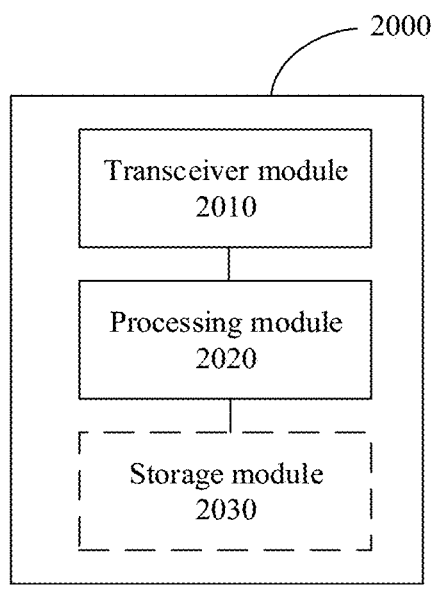
FIG. 20A is a schematic diagram of a first PUSCH occasion according to an embodiment of this application.
FIG. 20B is a schematic diagram of a first PUSCH occasion according to an embodiment of this application.
FIG. 21 is a schematic block diagram of a communications apparatus 2000 according to an embodiment of this application.

FIG. 20A and FIG. 20B are used as examples for description. FIG. 20A and FIG. 20B each are a schematic diagram of a first PUSCH occasion according to an embodiment of this application. As shown in FIG. 20A and FIG. 20B, the first PUSCH occasions determined according to any one of the foregoing embodiments include a PUSCH occasion #0, a PUSCH occasion #1, and a PUSCH occasion #2, and unavailable symbols include a symbol 6 to a symbol 8 of a slot n (symbols denoted by a shadow part in FIG. 20A and FIG. 20B). The PUSCH occasion #1 and the PUSCH occasion #2 partially overlap the unavailable symbols. In this embodiment, a time domain resource of a first PUSCH occasion may be adjusted in the foregoing manner, so that a time domain resource of an adjusted first PUSCH occasion does not overlap the unavailable symbols.

For example, for the PUSCH occasion #1, the terminal device may determine, as the PUSCH occasion #1 shown in FIG. 20B, first one $(Z-N_{GP})$ available time domain symbol in two (Z=2) consecutive available time domain symbols of the PUSCH occasion #1 shown in FIG. 20A. Because a time domain resource length of the PUSCH occasion #1 shown in FIG. 20B is less than the first time domain length threshold (X=2), the PUSCH occasion #1 shown in FIG. 20B is a time domain resource of an invalid first PUSCH occasion.

For the PUSCH occasion #2, the terminal device may determine, as the PUSCH occasion #2 shown in FIG. 20B, two (Z=2) consecutive available time domain symbols of the PUSCH occasion #2 shown in FIG. 20A. A time domain resource length of the PUSCH occasion #2 shown in FIG. 20B is equal to the first time domain length threshold (X=2). In this case, the PUSCH occasion #2 is determined as a time domain resource of a valid first PUSCH occasion.

In this embodiment, a valid first PUSCH occasion is determined based on positions of a time domain resource of a first PUSCH occasion and an unavailable symbol, so that the terminal device can be prevented from sending uplink data on the unavailable symbol.

Based on any one of the foregoing embodiments, in another implementation, if a time-frequency resource of a PUSCH occasion on time domain resources of any one or more first PUSCH occasions in the time domain resources of the plurality of first PUSCH occasions satisfies at least one of the following conditions, the time-frequency resource of the PUSCH occasion is invalid. The condition is:

overlapping the foregoing unavailable symbol; and/or overlapping a valid PRACH time-frequency resource; and/or before a synchronization signal block in a same slot; and/or PRACH time-frequency resources on which all random access preambles associated with the time-frequency resource of the PUSCH occasion are located are invalid; and/or in a random access preamble set that is configured by the network device or predefined and that is associated with the PUSCH occasion or a PUSCH resource unit on the PUSCH occasion, there is no random access preamble located on a PRACH time-frequency resource before a time domain resource on which the PUSCH occasion is located; and/or in a random access preamble set that is configured by the network device or predefined and that is associated with the PUSCH occasion or a PUSCH resource unit on the PUSCH occasion, there is no random access preamble located on a valid PRACH time-frequency resource.

The foregoing describes in detail the uplink transmission time domain resource determining method in the embodiments of this application. The following describes a communications apparatus in the embodiments of this application.

The embodiments of this application describe in detail a schematic structure of the communications apparatus.

In an example, FIG. 21 is a schematic block diagram of a communications apparatus 2000 according to an embodiment of this application. The apparatus 2000 in this embodiment of this application may be the terminal device in the foregoing method embodiments, or may be one or more chips in the terminal device. The apparatus 2000 may be configured to perform some or all functions of the terminal device in the foregoing method embodiments. The apparatus 2000 may include a transceiver module 2010 and a processing module 2020. Optionally, the apparatus 2000 may further include a storage module 2030.

For example, the transceiver module 2010 may be configured to receive the first information from the network device in step S101 in the foregoing method embodiment, or configured to receive the first information from the network device in step S201, send the first message in step 203, and receive the second message from the network device in step 204.

The processing module 2020 may be configured to perform step S102, configured to perform step S202, configured to perform step 301 and step 302, configured to perform step 401 and step 402, or configured to perform step 501 and step 502 in the foregoing method embodiment.

Alternatively, the apparatus 2000 may be configured as a general-purpose processing system, for example, collectively referred to as a chip. The processing module 2020 may include one or more processors that provide a processing function. The transceiver module 2010 may be, for example, an input/output interface, a pin, or a circuit, and the input/output interface may be configured to be responsible for information exchange between the chip system and the outside. For example, the input/output interface may output uplink data of the terminal device to another module other than the chip for processing. The processing module may execute computer executable instructions stored in the storage module, to implement a function of the terminal device in the foregoing method embodiment. In an example, the storage module 2030 optionally included in the apparatus 2000 may be a storage unit in the chip, such as a register or a cache. The storage module 2030 may alternatively be a storage unit that is in the terminal device and that is outside the chip, such as a read-only memory (read-only memory, ROM for short) or another type of static storage device that can store static information and instructions, or a random access memory (random access memory, RAM for short).

Figure 22:
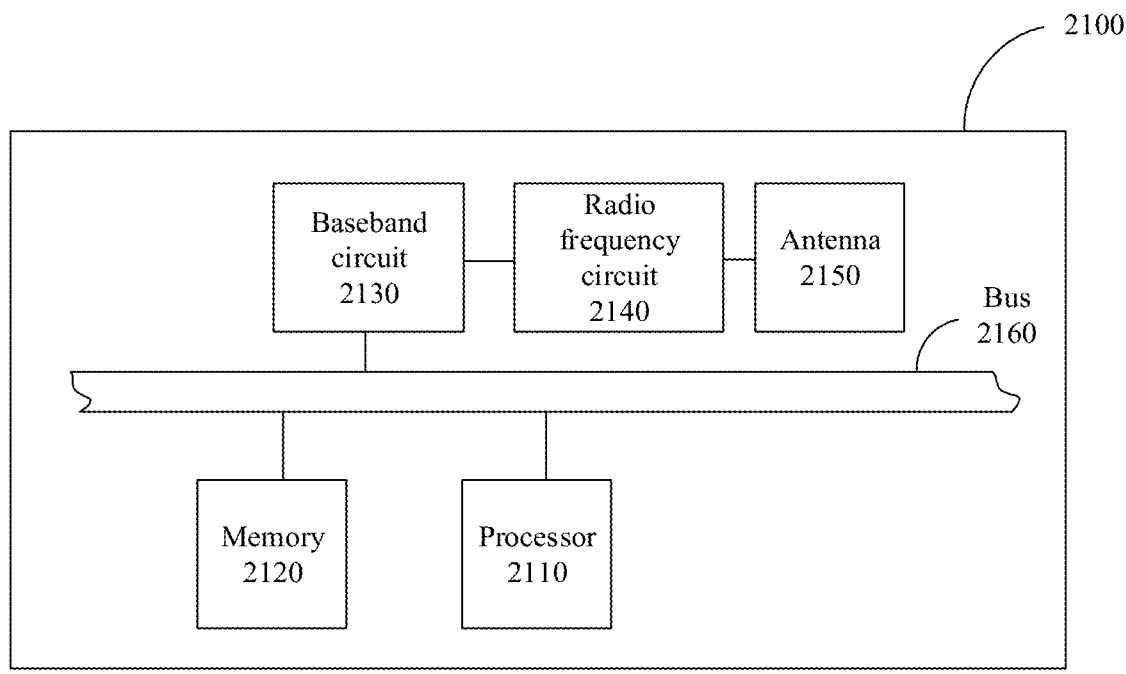
FIG. 22 is a schematic block diagram of another communications apparatus 2100 according to an embodiment of this application.

In another example, FIG. 22 is a schematic block diagram of another communications apparatus 2100 according to an embodiment of this application. The apparatus 2100 in this embodiment of this application may be the terminal device in the foregoing method embodiments, and the apparatus 2100 may be configured to perform some or all functions of the terminal device in the foregoing method embodiments. The apparatus 2100 may include a processor 2110, a baseband circuit 2130, a radio frequency circuit 2140, and an antenna 2150. Optionally, the apparatus 2100 may further include a memory 2120. The processor 2110, the memory 2120, and the baseband circuit 2130 of the apparatus 2100 are coupled together by using a bus 2160. In addition to a data bus, the bus system 2160 further includes a power bus, a control bus, and a status signal bus. However, for clear description, various types of buses in the figure are marked as the bus system 2160. The radio frequency circuit 2140 is connected to the baseband circuit 2130, and the antenna 2150 is connected to the radio frequency circuit 2140.

The processor 2110 may be configured to control the terminal device, and perform processing that is performed by the terminal device in the foregoing embodiments. The processor 2110 may perform processing processes related to the terminal device in the foregoing method embodiment and/or may be used for other processes of the technology described in this application, and may further run an operating system, manage the bus, and execute a program or instructions stored in the memory. For example, the processor is configured to perform step S102, configured to perform step S202, configured to perform step 301 and step 302, configured to perform step 401 and step 402, or configured to perform step 501 and step 502 in the foregoing method embodiment.

The baseband circuit 2130, the radio frequency circuit 2140, and the antenna 2150 may be configured to support information sending and receiving between the terminal device and the network device in the foregoing embodiments, to support wireless communication between the terminal device and the network device, for example, receive the first information from the network device in step S101 in the foregoing method embodiment, or receive the first information from the network device in step S201, send the first message in step 203, and receive the second message from the network device in step 204. In an example, the first information sent by the network device is received by using the antenna 2150, the radio frequency circuit 2140 performs processing such as filtering, amplification, down-conversion, and digitization, then the baseband circuit 2130 performs baseband processing such as decoding and protocol-based data decapsulation, and the processor 2110 performs processing to restore service data and signaling information sent by the network device. In another example, uplink data of the terminal device may be processed by the processor 2110, the baseband circuit 2130 performs baseband processing such as protocol-based encapsulation and coding, further the radio frequency circuit 2140 performs radio frequency processing such as analog conversion, filtering, amplification, and up-conversion, and processed uplink data is transmitted by using the antenna 2150.

The memory 2120 may be configured to store program code and data of a station, and the memory 2120 may be the storage module 2030 in FIG. 21. It may be understood that the baseband circuit 2130, the radio frequency circuit 2140, and the antenna 2150 may be further configured to support communication between the terminal device and another network entity, for example, configured to support communication between the terminal device and a network element on a core network side. As shown in FIG. 22, the memory 2120 is separated from the processor 2110. However, a person skilled in the art easily understands that the memory 2120 or any part thereof may be located outside the communications apparatus 2100. For example, the memory 2120 may include a transmission line and/or a computer product separated from a wireless node, and these media may all be accessed by the processor 2110 by using the bus interface 2160. Alternatively, the memory 2120 or any portion thereof may be integrated into the processor 2110, for example, may be a cache and/or a general-purpose register.

It may be understood that FIG. 22 shows only a simplified design of the terminal device. For example, in actual application, the terminal device may include any quantity of transmitters, receivers, processors, memories, and the like. All terminal devices that can implement this application may fall within the protection scope of this application.

An embodiment of this application further provides a communications apparatus. The apparatus may be a chip of the terminal device in the foregoing method embodiments. The chip may include the processor 2110, the baseband circuit 2130, and a communications interface, or the chip may include the baseband circuit 2130 and a communications interface. The apparatus may be configured to perform some or all functions of the terminal device in the foregoing method embodiments. For implementation principles and technical effects of the apparatus, refer to the descriptions in the foregoing embodiments. Details are not described herein again.

In a possible implementation, the communications apparatus may alternatively be implemented by using the following: one or more field programmable gate arrays (FPGAs), a programmable logic device (PLD), a controller, a state machine, gate logic, a discrete hardware component, any other proper circuit, or any combination of circuits that can perform various functions described in this application. In still another example, an embodiment of this application further provides a computer storage medium. The computer storage medium may store program instructions used to indicate any one of the foregoing methods, so that a processor executes the program instructions to implement the method and the function that are related to the terminal device in the foregoing method embodiments.

Figure 23:
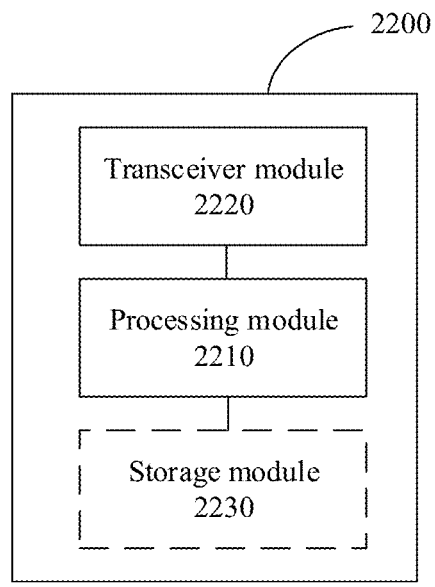
FIG. 23 is a schematic block diagram of another communications apparatus 2200 according to an embodiment of this application.

The embodiments of this application describe in detail a schematic structure of the communications apparatus. In an example, FIG. 23 is a schematic block diagram of a communications apparatus 2200 according to an embodiment of this application. The apparatus 2200 in this embodiment of this application may be the network device in the foregoing method embodiments, or may be one or more chips in the network device. The apparatus 2200 may be configured to perform some or all functions of the network device in the foregoing method embodiments. The apparatus 2200 may include a processing module 2210 and a transceiver module 2220. Optionally, the apparatus 2200 may further include a storage module 2230. For example, the transceiver module 2220 may be used by the network device to send the first information in step S101 in the foregoing method embodiment, or to receive the first message from the terminal device in step S203 and send the second message in step S204.

Alternatively, the apparatus 2200 may be configured as a universal processing system, which, for example, is generally referred to as a chip. The processing module 2210 may include one or more processors that provide a processing function. The transceiver module may be, for example, an input/output interface, a pin, or a circuit. The input/output interface may be responsible for information exchange between the chip system and the outside. For example, the input/output interface may output first information to another module outside the chip for processing. The one or more processors may execute a computer executable instruction stored in the storage module to implement a function of the network device in the foregoing method embodiments. In an example, the storage module 2230 optionally included in the apparatus 2200 may be a storage unit in the chip, such as a register or a cache. The storage module 2230 may alternatively be a storage unit that is in the network device and that is outside the chip, such as a read-only memory (ROM) or another type of static storage device that can store static information and instructions, or a random access memory (RAM).

Figure 24:
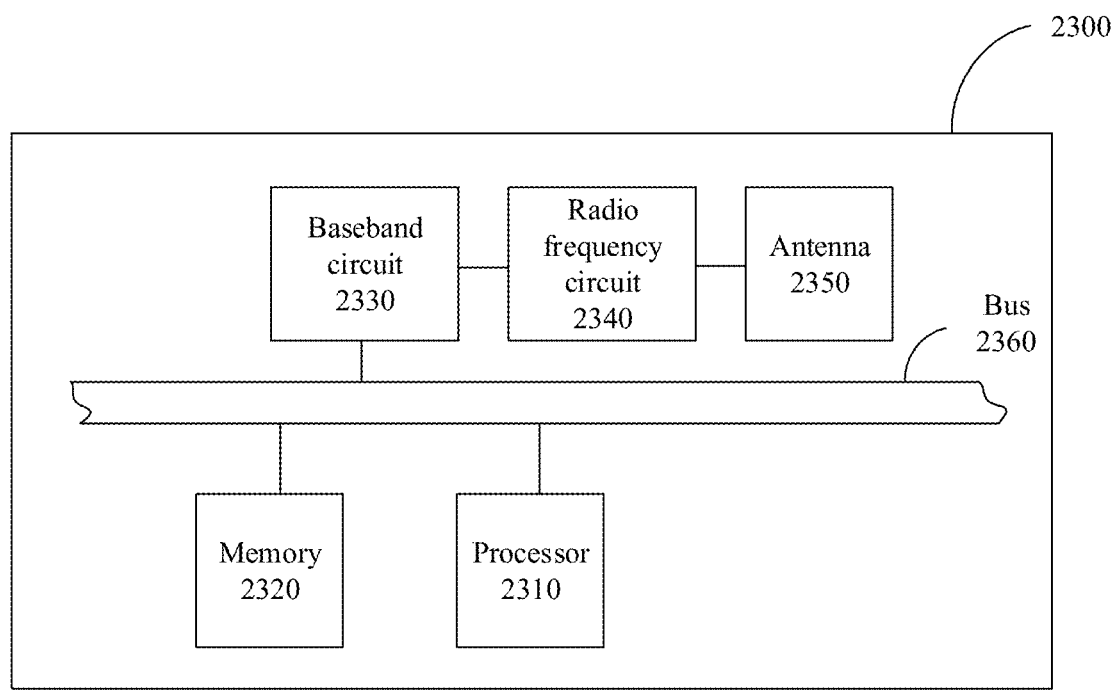
FIG. 24 is a schematic block diagram of another communications apparatus 2300 according to an embodiment of this application.

In another example, FIG. 24 is a schematic block diagram of another communications apparatus 2300 according to an embodiment of this application. The apparatus 2300 in this embodiment of this application may be the network device in the foregoing method embodiments, and the apparatus 2300 may be configured to perform some or all functions of the network device in the foregoing method embodiments. The apparatus 2300 may include a processor 2310, a baseband circuit 2330, a radio frequency circuit 2340, and an antenna 2350. Optionally, the apparatus 2300 may further include a memory 2320. The processor 2310, the memory 2320, and the baseband circuit 2330 of the apparatus 2300 are coupled together by using a bus 2360. In addition to a data bus, the bus system 2360 further includes a power bus, a control bus, and a status signal bus. However, for clear description, various types of buses in the figure are marked as the bus system 2360. The radio frequency circuit 2340 is connected to the baseband circuit 2330, and the antenna 2350 is connected to the radio frequency circuit 2340.

The processor 2310 may be configured to control the network device, and perform processing that is performed by the network device in the foregoing embodiments. The processor 2310 may perform processing processes related to the network device in the foregoing method embodiment and/or may be used for other processes of the technology described in this application, and may further run an operating system, manage the bus, and execute a program or instructions stored in the memory. For example, the processor is configured to determine the first information in step 101 in the foregoing method.

The baseband circuit 2330, the radio frequency circuit 2340, and the antenna 2350 may be configured to support information sending and receiving between the network device and the terminal device in the foregoing embodiments, to support wireless communication between the network device and the terminal device, for example, send the first information in step S101 in the foregoing method embodiment, or receive the first message from the terminal device in step S203 and send the second message in step S204. In an example, the first message sent by the terminal device is received by using the antenna 2350, the radio frequency circuit performs processing such as filtering, amplification, down-conversion, and digitization, then the baseband circuit performs baseband processing such as decoding and protocol-based data decapsulation, and the processor 2310 performs processing to restore service data and signaling information sent by the terminal device. In another example, the first information of the network device may be processed by the processor 2310, the baseband circuit 2330 performs baseband processing such as protocol-based encapsulation and coding, further the radio frequency circuit 2340 performs radio frequency processing such as analog conversion, filtering, amplification, and up-conversion, and processed first information is transmitted by using the antenna 2350. The memory 2320 may be configured to store program code and data of the network device, and the memory 2320 may be the storage module 2230 in FIG. 23. It may be understood that the baseband circuit 2330, the radio frequency circuit 2340, and the antenna 2350 may be further configured to support communication between the network device and another network entity, for example, configured to support communication between the network device and another network device.

It may be understood that FIG. 24 shows only a simplified design of the network device. For example, in actual application, the network device may include any quantity of transmitters, receivers, processors, memories, or the like, and all network devices that can implement this application may fall within the protection scope of the embodiments of this application.

An embodiment of this application further provides a communications apparatus. The apparatus may be a chip of the network device in the foregoing method embodiments. The chip may include the processor 2310, the baseband circuit 2330, and a communications interface, or the chip may include the baseband circuit 2330 and a communications interface. The apparatus may be configured to perform some or all functions of the network device in the foregoing method embodiments. For implementation principles and technical effects of the apparatus, refer to the descriptions in the foregoing embodiments. Details are not described herein again.

In a possible implementation, the communications apparatus may alternatively be implemented by using the following: one or more field programmable gate arrays (FPGAs), a programmable logic device (PLD), a controller, a state machine, gate logic, a discrete hardware component, any other proper circuit, or any combination of circuits that can perform various functions described in this application.

In still another example, an embodiment of this application further provides a computer storage medium. The computer storage medium may store program instructions used to indicate any one of the foregoing methods, so that a processor executes the program instructions to implement the method and the function that are related to the network device in the foregoing method embodiments.

The processor in each of the apparatus 2100 and the apparatus 2300 may be a general-purpose processor such as a general-purpose central processing unit (CPU), a network processor (NP), or a microprocessor, or may be an application-specific integrated circuit (ASIC), or one or more integrated circuits configured to control program execution in the solutions of this application. The processor may alternatively be a digital signal processor (DSP), a field programmable gate array (FPGA) or another programmable logic component, a discrete gate or a transistor logic device, or a discrete hardware component. Alternatively, the controller/processor may be a combination of processors implementing a computing function, for example, a combination of one or more microprocessors, or a combination of the DSP and the microprocessor. The processor usually performs logical and arithmetic operations according to program instructions stored in the memory.

The memory in the foregoing apparatus 2100 and apparatus 2300 may further store an operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, a magnetic disk storage, or the like. The memory may be a combination of the foregoing memories. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the processes or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. An uplink transmission time domain resource determining method, comprising:
   receiving, by a terminal device, first information from a network device, wherein the first information is for configuring a time domain resource of a physical uplink shared channel (PUSCH) occasion, and the first information comprises guard period configuration information and time domain resource configuration information of the PUSCH occasion; and
   determining, by the terminal device, time domain resources of a plurality of PUSCH occasions across one or more slots based on the first information, wherein for each respective PUSCH occasion all time domain symbols of the respective PUSCH occasion are in a single slot, wherein the one or more slots comprise a slot having two adjacent PUSCH occasions separated by a time domain interval, and wherein the time domain interval is greater than or equal to a guard period configured based on the guard period configuration information;
   wherein a PUSCH occasion of the plurality of PUSCH occasions satisfying a preset condition is a valid PUSCH occasion, wherein the preset condition comprises:
      all the symbols of a time domain resource of the PUSCH occasion are not located in a time period T2 after a downlink symbol; and
      all the symbols of the time domain resource of the PUSCH occasion are not located in a time period T2 after the last symbol of a synchronization signal block.

2. The method according to claim 1, wherein a time domain resource length of each of the plurality of PUSCH occasions is greater than or equal to a first time domain length threshold.

3. The method according to claim 1, wherein the time domain resource configuration information of the PUSCH occasion comprises: configuration information of a time domain resource start position, configuration information of a time domain resource length of the PUSCH occasion, and a quantity P of slots for configuring PUSCH occasions;
   wherein the configuration information of the time domain resource start position comprises at least one of start slot configuration information or start symbol configuration information, wherein the start slot configuration information is for determining the first slot of the plurality of PUSCH occasions, and wherein the start symbol configuration information is for determining a sequence number that is of the first symbol of the plurality of PUSCH occasions in each of the P slots;
   wherein the configuration information of the time domain resource length of the PUSCH occasion is for configuring the time domain resource length of the PUSCH occasion;
   wherein the quantity P of slots for configuring PUSCH occasions represents a quantity of consecutive slots occupied by the plurality of PUSCH occasions configured based on the first information.

4. The method according to claim 3, wherein the method further comprises:
   receiving configuration information of a quantity of time domain resources of PUSCH occasions in each of the P consecutive slots.

5. The method according to claim 3, wherein there is a guard period separating any two adjacent PUSCH occasions in the time domain resources of the PUSCH occasions in each of the P slots.

6. The method according to claim 1, wherein the preset condition further comprises:
   the time domain resource of the PUSCH occasion does not include a downlink symbol; and/or
   the time domain resource of the PUSCH occasion is not located before a synchronization signal block in a same slot; and/or
   the time domain resource of the PUSCH occasion does not overlap a valid physical random access channel (PRACH) time-frequency resource.

7. The method according to claim 1, wherein the preset condition further comprises:
   the time domain resource of the PUSCH occasion is not located before a synchronization signal block in a same slot; and
   the time domain resource of the PUSCH occasion does not overlap a valid physical random access channel (PRACH) time-frequency resource.

8. An uplink transmission time domain resource determining method, comprising:
   sending, by a network device, first information to a terminal device, wherein the first information is for configuring a time domain resource of a physical uplink shared channel (PUSCH) occasion, and the first information comprises guard period configuration information and time domain resource configuration information of the PUSCH occasion; and
   determining, by the network device, time domain resources of a plurality of PUSCH occasions across one or more slots based on the first information, wherein for each respective PUSCH occasion all time domain symbols of the respective PUSCH occasion are in a single slot, wherein the one or more slots comprise a slot having two adjacent PUSCH occasions separated by a time domain interval, and wherein the time domain interval is greater than or equal to a guard period configured based on the guard period configuration information;

wherein a PUSCH occasion of the plurality of PUSCH occasions satisfying a preset condition is a valid PUSCH occasion, wherein the preset condition comprises:
all the symbols of a time domain resource of the PUSCH occasion are not located in a time period T2 after a downlink symbol; and/or
all the symbols of a time domain resource of the PUSCH occasion are not located in a time period T2 after the last symbol of a synchronization signal block.

9. The method according to claim 8, wherein a time domain resource length of each of the plurality of PUSCH occasions is greater than or equal to a first time domain length threshold.

10. The method according to claim 8, wherein the time domain resource configuration information of the PUSCH occasion comprises: configuration information of a time domain resource start position, configuration information of a time domain resource length of the PUSCH occasion, and a quantity P of slots for configuring PUSCH occasions;
wherein the configuration information of the time domain resource start position comprises at least one of start slot configuration information or start symbol configuration information, wherein the start slot configuration information is for determining the first slot of the plurality of PUSCH occasions, and wherein the start symbol configuration information is for determining a sequence number that is of the first symbol of the plurality of PUSCH occasions in each of the P slots;
wherein the configuration information of the time domain resource length of the PUSCH occasion is for configuring the time domain resource length of the PUSCH occasion;
wherein the quantity P of slots for configuring PUSCH occasions represents a quantity of consecutive slots occupied by the plurality of PUSCH occasions configured based on the first information.

11. The method according to claim 10, wherein the method further comprises:
sending configuration information of a quantity of time domain resources of PUSCH occasions in each of the P consecutive slots.

12. The method according to claim 10, wherein there is a guard period separating any two adjacent PUSCH occasions in the time domain resources of the PUSCH occasions in each of the P slots.

13. The method according to claim 8, wherein the preset condition comprises:
the time domain resource of the PUSCH occasion does not include a downlink symbol; and/or
the time domain resource of the PUSCH occasion is not located before a synchronization signal block in a same slot; and/or
the time domain resource of the PUSCH occasion does not overlap a valid physical random access channel (PRACH) time-frequency resource.

14. A communications apparatus, comprising:
one or more processors; and
a memory, configured to store one or more programs;
wherein the one or more processors are configured to execute the one or more programs to facilitate performance of the following by the communications apparatus:
receiving first information from a network device, wherein the first information is for configuring a time domain resource of a physical uplink shared channel (PUSCH) occasion, and the first information comprises guard period configuration information and time domain resource configuration information of the PUSCH occasion; and
determining time domain resources of a plurality of PUSCH occasions across one or more slots based on the first information, wherein for each respective PUSCH occasion all time domain symbols of the respective PUSCH occasion are in a single slot, wherein the one or more slots comprise a slot having two adjacent PUSCH occasions separated by a time domain interval, and wherein the time domain interval is greater than or equal to a guard period configured based on the guard period configuration information;
wherein a PUSCH occasion of the plurality of PUSCH occasions satisfying a preset condition is a valid PUSCH occasion, wherein the preset condition comprises:
all the symbols of a time domain resource of the PUSCH occasion are not located in a time period T2 after a downlink symbol; and/or
all the symbols of a time domain resource of the PUSCH occasion are not located in a time period T2 after the last symbol of a synchronization signal block.

15. The apparatus according to claim 14, wherein a time domain resource length of each of the plurality of PUSCH occasions is greater than or equal to a first time domain length threshold.

16. The apparatus according to claim 14, wherein the time domain resource configuration information of the PUSCH occasion comprises: configuration information of a time domain resource start position, configuration information of a time domain resource length of the PUSCH occasion, and a quantity P of slots for configuring PUSCH occasions;
wherein the configuration information of the time domain resource start position comprises at least one of start slot configuration information or start symbol configuration information, wherein the start slot configuration information is for determining the first slot of the plurality of PUSCH occasions, and wherein the start symbol configuration information is for determining a sequence number that is of the first symbol of the plurality of PUSCH occasions in each of the P slots;
wherein the configuration information of the time domain resource length of the PUSCH occasion is for configuring the time domain resource length of the PUSCH occasion;
wherein the quantity P of slots for configuring PUSCH occasions represents a quantity of consecutive slots occupied by the plurality of PUSCH occasions configured based on the first information.

17. The apparatus according to claim 16, wherein the one or more processors are further configured to execute the one or more programs to facilitate performance of the following by the communications apparatus:
receiving configuration information of a quantity of time domain resources of PUSCH occasions in each of the P consecutive slots.

18. The apparatus according to claim 16, wherein there is a guard period separating any two adjacent PUSCH occasions in the time domain resources of the PUSCH occasions in each of the P slots.

19. The apparatus according to claim 14, wherein the preset condition further comprises:
the time domain resource of the PUSCH occasion does not include a downlink symbol; and/or the time domain resource of the PUSCH occasion is not located before a synchronization signal block in a same slot; and/or the time domain resource of the PUSCH occasion does not overlap a valid physical random access channel (PRACH) time-frequency resource.

* * * * *